United States Patent
Tighe et al.

(10) Patent No.: US 12,162,625 B2
(45) Date of Patent: Dec. 10, 2024

(54) COMPACT VERTIPORT WITH EFFICIENT SPACE UTILIZATION

(71) Applicant: Wisk Aero LLC, Mountain View, CA (US)

(72) Inventors: James Joseph Tighe, Mountain View, CA (US); Geoffrey Alan Long, Montara, CA (US); Uri Tzarnotzky, Sunnyvale, CA (US)

(73) Assignee: Wisk Aero LLC, Mountain View, CA (US)

( * ) Notice: Subject to any disclaimer, the term of this patent is extended or adjusted under 35 U.S.C. 154(b) by 0 days.

(21) Appl. No.: 17/520,006

(22) Filed: Nov. 5, 2021

(65) Prior Publication Data
US 2022/0144451 A1    May 12, 2022

Related U.S. Application Data

(60) Provisional application No. 63/111,522, filed on Nov. 9, 2020.

(51) Int. Cl.
*B64F 1/22* (2024.01)
*B60L 53/30* (2019.01)
(Continued)

(52) U.S. Cl.
CPC ............... *B64F 1/22* (2013.01); *B60L 53/30* (2019.02); *B60L 53/50* (2019.02); *B64F 1/30* (2013.01); *B64F 1/36* (2013.01); *B60L 2200/10* (2013.01)

(58) Field of Classification Search
CPC ...... B64F 1/22; B64F 1/30; B64F 1/36; B64F 1/007; B60L 53/30; B60L 53/50; B60L 2200/10
See application file for complete search history.

(56) References Cited

U.S. PATENT DOCUMENTS

| | | | |
|---|---|---|---|
| 3,729,153 A * | 4/1973 | Wilde | B64F 1/00 244/114 R |
| 4,223,856 A * | 9/1980 | DiVincenzo | B64F 1/22 254/133 R |

(Continued)

FOREIGN PATENT DOCUMENTS

| | | |
|---|---|---|
| EP | 2925610 B1 | 7/2019 |
| WO | 2018005451 A1 | 1/2018 |
| WO | 2019241434 A1 | 12/2019 |

OTHER PUBLICATIONS

PCT/US2021/058281, "International Search Report and Written Opinion", Feb. 14, 2022, 11 pages.

(Continued)

*Primary Examiner* — Joshua J Michener
*Assistant Examiner* — Cindi M Curry
(74) *Attorney, Agent, or Firm* — Kilpatrick Townsend & Stockton LLP

(57) ABSTRACT

Embodiments provide a compact vertiport system. The vertiport system may be efficient and compact by combining, into one space and time period, multiple activities that typically take place in different spaces and different times. For example, when an aircraft is being moved from a landing zone to a takeoff zone, the aircraft may also be charged simultaneously. Also, passenger exchange may take place while the aircraft is being moved. As a result, compact vertiport systems may fit into smaller spaces (e.g., tops of buildings, or smaller plots of land).

19 Claims, 13 Drawing Sheets

(51) Int. Cl.
  *B60L 53/50* (2019.01)
  *B64F 1/30* (2006.01)
  *B64F 1/36* (2024.01)

(56) References Cited

U.S. PATENT DOCUMENTS

| | | | |
|---|---|---|---|
| 5,441,217 A * | 8/1995 | Novinger | B64F 1/36 |
| | | | 244/114 R |
| 9,156,564 B2 | 10/2015 | Endres | |
| 9,711,053 B1 * | 7/2017 | Williamson | G08G 5/0013 |
| 9,771,148 B2 | 9/2017 | Cox et al. | |
| 11,198,519 B1 * | 12/2021 | Seeley | B64F 1/31 |
| 11,565,801 B2 * | 1/2023 | Tal | B64D 11/00 |
| 11,603,210 B2 * | 3/2023 | Tal | B64F 1/24 |
| 2010/0096494 A1 * | 4/2010 | Braier | B64F 1/228 |
| | | | 244/50 |
| 2013/0184977 A1 * | 7/2013 | Venkatasubramanian | |
| | | | G05D 1/0289 |
| | | | 701/117 |
| 2018/0134413 A1 | 5/2018 | Halsey et al. | |
| 2019/0106224 A1 * | 4/2019 | Nishikawa | B64D 27/24 |
| 2020/0047918 A1 * | 2/2020 | Bickelmeyer | F03D 9/255 |
| 2020/0055594 A1 * | 2/2020 | Tal | B64F 1/31 |
| 2020/0130863 A1 | 4/2020 | Zosel | |
| 2021/0269175 A1 * | 9/2021 | Tal | B64U 70/90 |
| 2022/0144451 A1 * | 5/2022 | Tighe | B64F 1/007 |
| 2022/0169400 A1 * | 6/2022 | Seeley | B64C 5/02 |
| 2023/0015158 A1 * | 1/2023 | Evans | B64U 50/39 |

OTHER PUBLICATIONS

PCT/US2021/058281, "International Preliminary Report on Patentability", May 19, 2023, 7 pages.
EP21890163.5, "Extended European Search Report", Aug. 30, 2024, 9 pages.
NZ800006, "First Examination Report", Oct. 16, 2024, 4 pages.

* cited by examiner

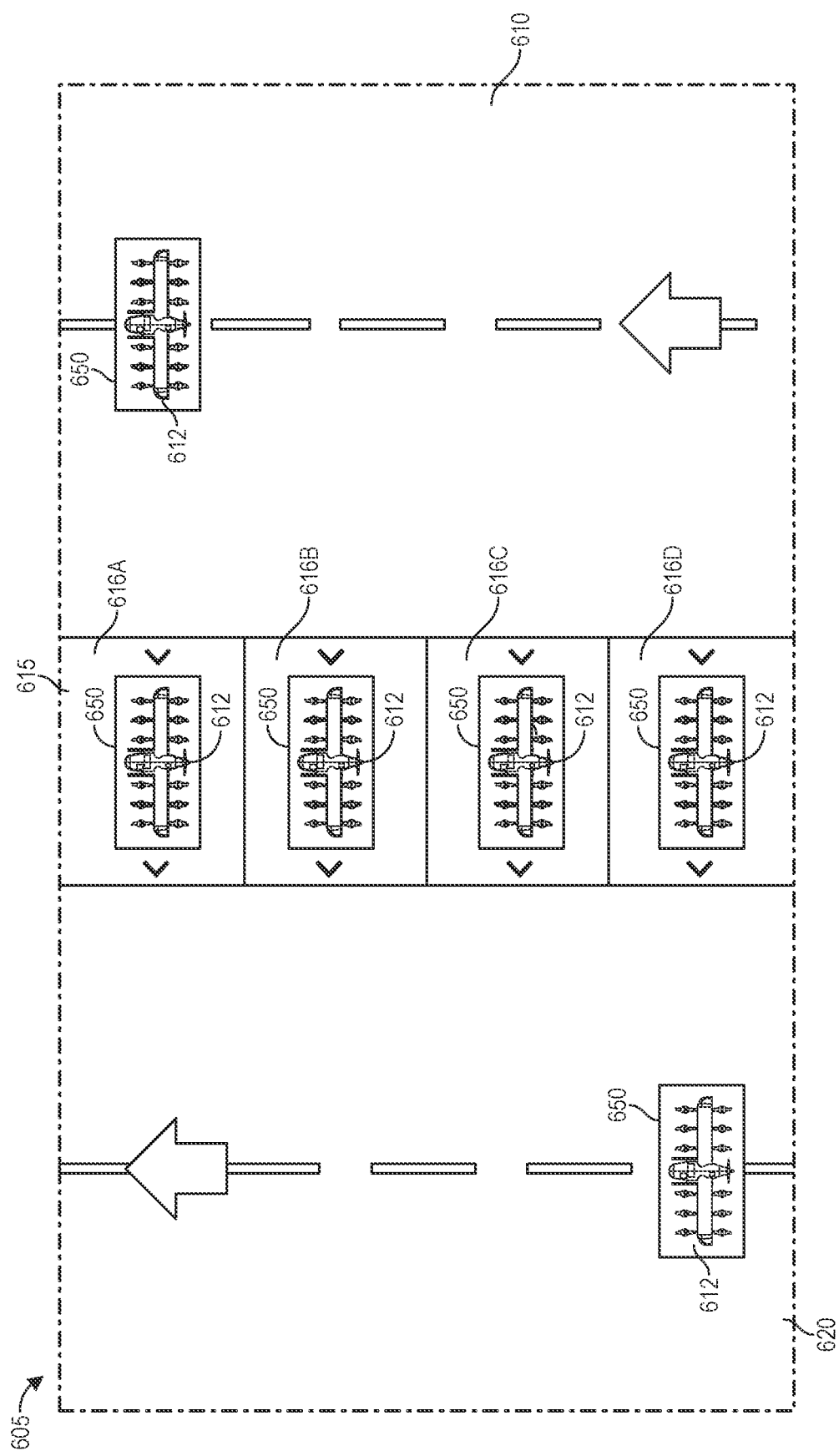

| LOCATION | 1 | 2 | 3 | 4 | 5 | 6 | 7 | 8 | 9 | 10 | 11 | 12 | 13 |
|---|---|---|---|---|---|---|---|---|---|---|---|---|---|
| 820A | | | | | | Aircraft 1 | Aircraft 3 | Aircraft 6 | Aircraft 8 | Aircraft 9 | Aircraft 11 | Aircraft 14 | Aircraft 16 |
| 820B | | | | | | Aircraft 2 | Aircraft 4 | Aircraft 5 | Aircraft 7 | Aircraft 10 | Aircraft 12 | Aircraft 13 | Aircraft 15 |
| 810A | Aircraft 1 | Aircraft 3 | Aircraft 5 | Aircraft 7 | Aircraft 9 | Aircraft 11 | Aircraft 13 | Aircraft 15 | Aircraft 1 | Aircraft 3 | Aircraft 5 | Aircraft 7 | Aircraft 9 |
| 810B | Aircraft 2 | Aircraft 4 | Aircraft 6 | Aircraft 8 | Aircraft 10 | Aircraft 12 | Aircraft 14 | Aircraft 16 | Aircraft 2 | Aircraft 4 | Aircraft 6 | Aircraft 8 | Aircraft 10 |
| 816A | | Aircraft 1 | Aircraft 1 | Aircraft 1 | Aircraft 1 | Aircraft 9 | Aircraft 9 | Aircraft 9 | Aircraft 9 | Aircraft 1 | Aircraft 1 | Aircraft 1 | Aircraft 1 |
| 816B | | | Aircraft 3 | Aircraft 3 | Aircraft 3 | Aircraft 3 | Aircraft 11 | Aircraft 11 | Aircraft 11 | Aircraft 11 | Aircraft 3 | Aircraft 3 | Aircraft 3 |
| 816G | | | | Aircraft 6 | Aircraft 6 | Aircraft 6 | Aircraft 6 | Aircraft 14 | Aircraft 14 | Aircraft 14 | Aircraft 14 | Aircraft 6 | Aircraft 6 |
| 816H | | | | | Aircraft 8 | Aircraft 8 | Aircraft 8 | Aircraft 8 | Aircraft 16 | Aircraft 16 | Aircraft 16 | Aircraft 16 | Aircraft 8 |
| 816C | | | | Aircraft 5 | Aircraft 5 | Aircraft 5 | Aircraft 5 | Aircraft 13 | Aircraft 13 | Aircraft 13 | Aircraft 13 | Aircraft 5 | Aircraft 5 |
| 816D | | | | | Aircraft 7 | Aircraft 7 | Aircraft 7 | Aircraft 7 | Aircraft 15 | Aircraft 15 | Aircraft 15 | Aircraft 15 | Aircraft 7 |
| 816E | | Aircraft 2 | Aircraft 2 | Aircraft 2 | Aircraft 2 | Aircraft 10 | Aircraft 10 | Aircraft 10 | Aircraft 10 | Aircraft 2 | Aircraft 2 | Aircraft 2 | Aircraft 2 |
| 816F | | | Aircraft 4 | Aircraft 4 | Aircraft 4 | Aircraft 4 | Aircraft 12 | Aircraft 12 | Aircraft 12 | Aircraft 4 | Aircraft 4 | Aircraft 4 | Aircraft 4 |

FIG. 9

COMPACT VERTIPORT WITH EFFICIENT SPACE UTILIZATION

RELATED APPLICATIONS

This application claims benefit under 35 USC § 119(e) to U.S. Provisional Patent Application No. 63/111,522 filed Nov. 9, 2020 and entitled "Vertiport And Charge Cart System," the disclosure of which is incorporated by reference herein in their entirety for all purposes.

BACKGROUND OF THE INVENTION

Small, personal, automated aircraft can provide efficient transportation, as they can travel direct routes. They may be especially efficient in areas of dense population with heavy road traffic. However, dense traffic areas such as cities typically have limited and expensive real estate, and there typically are not large areas of available land that would be suitable for an airport within cities.

SUMMARY

Described herein are examples (or embodiments) of a compact vertiport system with efficient space utilization. The vertiport system may be efficient and compact by combining, into one space and time period, multiple activities that typically take place in different spaces and at different times. For example, when an electric aircraft is being moved from a landing zone to a takeoff zone, one or more batteries of the electric aircraft may also be charged simultaneously. Also, passenger exchange may take place while the aircraft is being moved (e.g., in a slow, steady, safe manner). As a result, compact vertiport systems may fit into smaller spaces (e.g., tops of buildings, car parking areas, or other smaller plots of land).

Further, efficient configuration of different zones of a vertiport system may further improve the usage of limited space. As an example, a landing zone may connect directly to a transition zone (e.g., for recharging batteries and/or passenger exchange), and the transition zone may connect directly to a takeoff zone. This can enable an aircraft to be delivered directly from the end of a landing zone (e.g., a first runway or pad) to the beginning of a takeoff zone (e.g., a second runway or pad). In some embodiments, different zones of a vertiport system can be arranged in a z-shape. Further, multiple versions of similar zone-arrangements can be combined. For example, multiple z-shaped configurations may be adjacently positioned to fully utilize a rectangular space.

According to various embodiments, a system is provided that comprises a landing zone, a takeoff zone, and a transition zone including at least one surface positioned between the landing zone and the takeoff zone. The system further includes transport equipment configured to physically transport a plurality of aircraft simultaneously across the transition zone from the landing zone to the takeoff zone, and configured to allow passenger exchange at each of the plurality of aircraft while each of the plurality of aircraft is coupled to the transport equipment and located at the transition zone. The system also includes a plurality of chargers, wherein each charger is configured to electrically charge a battery of an aircraft from the plurality of aircraft while the aircraft is coupled to the transport equipment and located at the transition zone. Each charger includes a power source and an electrical coupler coupled to the power source, the electrical coupler configured to couple to and supply power to the battery of the aircraft.

According to further embodiments, the at least one surface includes at least one pathway. The transport equipment includes a plurality of carts configured to physically transport the plurality of aircraft simultaneously across the at least one pathway from the landing zone to the takeoff zone. The plurality of chargers are disposed on the plurality of carts such that each of the plurality of carts includes a charger from the plurality of chargers, and such that each cart from the plurality of carts is configured to simultaneously physically transport the aircraft and electrically charge the battery of the aircraft.

According to further embodiments, the at least one surface is a single pathway, where a beginning of the single pathway is adjacent to an end of the landing zone, and an end of the single pathway is adjacent to a beginning of the takeoff zone. The landing zone is oriented in a first direction, the takeoff zone is oriented in a second direction, and the single pathway is oriented in a third direction.

According to further embodiments, the first direction is parallel to the second direction, and the first direction and the second direction are both perpendicular to the third direction.

According to further embodiments, the first direction is parallel to the second direction, and the first direction and the second direction are both antiparallel to the third direction.

According to further embodiments, the at least one surface is in a form of a circular platform configured to physically support the plurality of aircraft simultaneously, and the transport equipment includes a motor coupled to the circular platform and configured to rotate the circular platform.

Embodiments further provide a method comprising receiving, by a system, an aircraft at a landing zone, physically transporting the aircraft from the landing zone across a transition zone to a takeoff zone, electrically charging one or more batteries of the aircraft while transporting the aircraft, allowing passenger exchange to take place at the aircraft while transporting the aircraft, depositing the aircraft at the takeoff zone, and allowing the aircraft to depart from the takeoff zone.

BRIEF DESCRIPTION OF THE DRAWINGS

Various embodiments of the invention are disclosed in the following detailed description and the accompanying drawings.

FIG. 6 illustrates an example of a vertiport system with multiple pathways in a transition zone, according to various embodiments.

FIG. 9 illustrates an exemplary method and schedule for alternating the use of various zones of a vertiport system, according to some embodiments.

DETAILED DESCRIPTION

Embodiments may be implemented in numerous ways, including as a process; an apparatus; and/or a system. In this specification, these implementations, or any other form that the invention may take, may be referred to as techniques. In general, the order of the steps of disclosed processes may be altered within the scope of the invention. Unless stated otherwise, a component may be implemented as a general component that is temporarily configured to perform the task at a given time or a specific component that is manufactured to perform the task.

Various embodiments provide a compact vertiport system with efficient space utilization. The vertiport system may be efficient and compact by combining, into one space and time period, multiple activities that typically take place in different spaces and at different times. For example, when an electric aircraft is being moved from a landing zone to a takeoff zone, one or more batteries of the electric aircraft may also be charged simultaneously. Also, passenger exchange may take place while the aircraft is being moved (e.g., in a slow, steady, safe manner). As a result, compact vertiport systems may fit into smaller spaces (e.g., tops of buildings, car parking areas, or other smaller plots of land).

Further, efficient configuration of different zones of a vertiport system may further improve the usage of limited space. As an example, a landing zone may connect directly to a transition zone (e.g., for recharging batteries and/or passenger exchange), and the transition zone may connect directly to a takeoff zone. This can enable an aircraft to be delivered directly from the end of a landing zone to the beginning of a takeoff zone. In some embodiments, different zones of a vertiport system can be arranged in a z-shape. Further, multiple versions of similar zone-arrangements can be combined. For example, multiple z-shaped configurations may be adjacently positioned to fully utilize a rectangular space.

Figure 1:
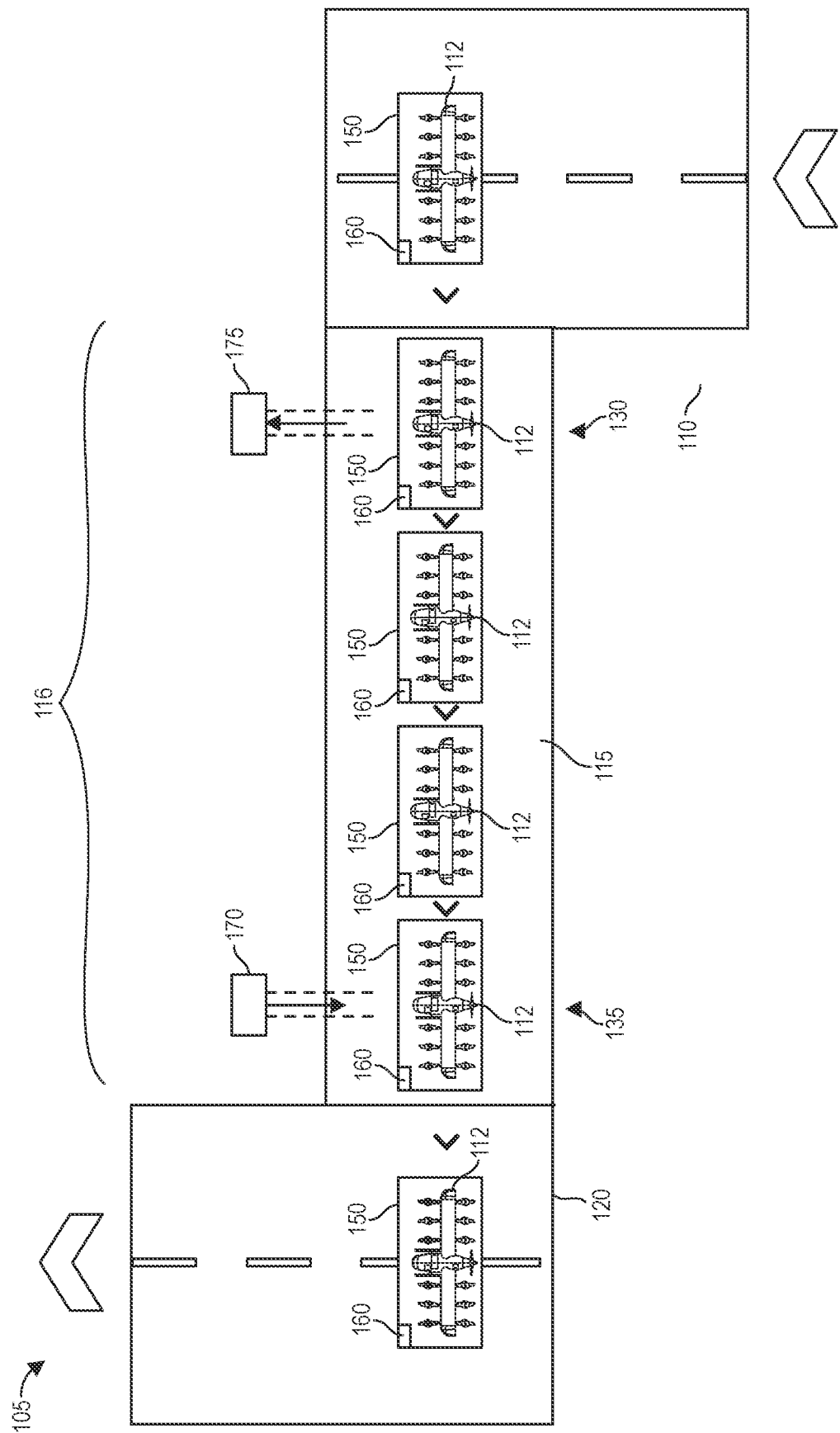
FIG. 1 illustrates an example of a vertiport system, according to various embodiments.

FIG. 1 illustrates an example of vertiport system 105, according to some embodiments. A vertiport system 105 may include infrastructure for receiving aircraft from flight, resetting the aircraft for a subsequent flight, and allowing the aircraft to depart for the subsequent flight. According to some embodiments, a vertiport may by similar to an airport, including at least some similar components. In contrast with a typical airport, a vertiport may further be configured for usage with aircraft that are capable of vertical takeoff and landing (VTOL). In some embodiments, a vertiport specifically configured for VTOL aircraft can have a smaller footprint, with smaller landing and takeoff areas as compared to a typical airport with typical runways.

As shown in FIG. 1, the vertiport system 105 may include a landing zone 110, a transition zone 115, and a takeoff zone 120. An aircraft 112 may arrive at the landing zone 110, and may later depart the vertiport system 105 via the takeoff zone 120. A transition zone 115 may connect the landing zone 110 to the takeoff zone 120. The transition zone 115 may host equipment and provide space for the aircraft 112 to finish a first flight, and for the aircraft 112 to become prepared for second flight. This can include equipment and space for recharging the aircraft 112 power supply (e.g., battery), exchanging passengers (e.g., disembarking passengers from the first flight, and embarking passengers for the second flight), and/or transporting the aircraft 112 from the landing zone 110 to the takeoff zone 120.

According to various embodiments, the aircraft 112 may be moved across the transition zone 115 continuously or iteratively. FIG. 1 illustrates several example positions of the aircraft 112 as it is moved from the landing zone 110 to the takeoff zone 120.

According to some embodiments, a plurality of aircraft may be present at the same time at the vertiport system 105. Each aircraft can be reset and processed simultaneously, being moved from the landing zone 110 to the takeoff zone 120, being recharged, and undergoing passenger exchange. For example, instead of illustrating the same aircraft 112 at different positions/times, FIG. 1 may be interpreted as an illustration of multiple different aircraft simultaneously present at the vertiport system 105, and in various different locations.

Embodiments provide various types of transport equipment configured to physically transport the aircraft 112 from the landing zone 110 to the takeoff zone 120. Transport equipment can include any suitable equipment that can support and/or move one or more aircraft 112. For example, transport equipment can include one or more carts, lifts, tugs, conveyor belts, track systems, and/or any other suitable mechanism. In FIG. 1, the transport equipment takes the form of a cart 150. There may be a plurality of carts, where each cart 150 is configured to physically transport one aircraft 112 at a time.

In various embodiments, the vertiport system 105 also includes one or more chargers 160 that are configured to electrically charge (e.g., recharge) one or more aircraft batteries. The chargers 160 may take various forms and be in various locations that allow the aircraft 112 to be charged while located in the transition zone 115 and/or while coupled to the transport equipment (e.g., a cart 150). A charger 160 can include a power source (e.g., battery) coupled to an electrical coupler (e.g., wires, cables, plugs, and/or other electrical contacts) that is configured to couple to and supply power to one or more batteries of the aircraft 112. In FIG. 1, one charger 160 is disposed on each cart 150. As a result, each cart 150 can simultaneously recharge the aircraft 112 and physically transport the aircraft 112.

I. Carts

Figure 2A:
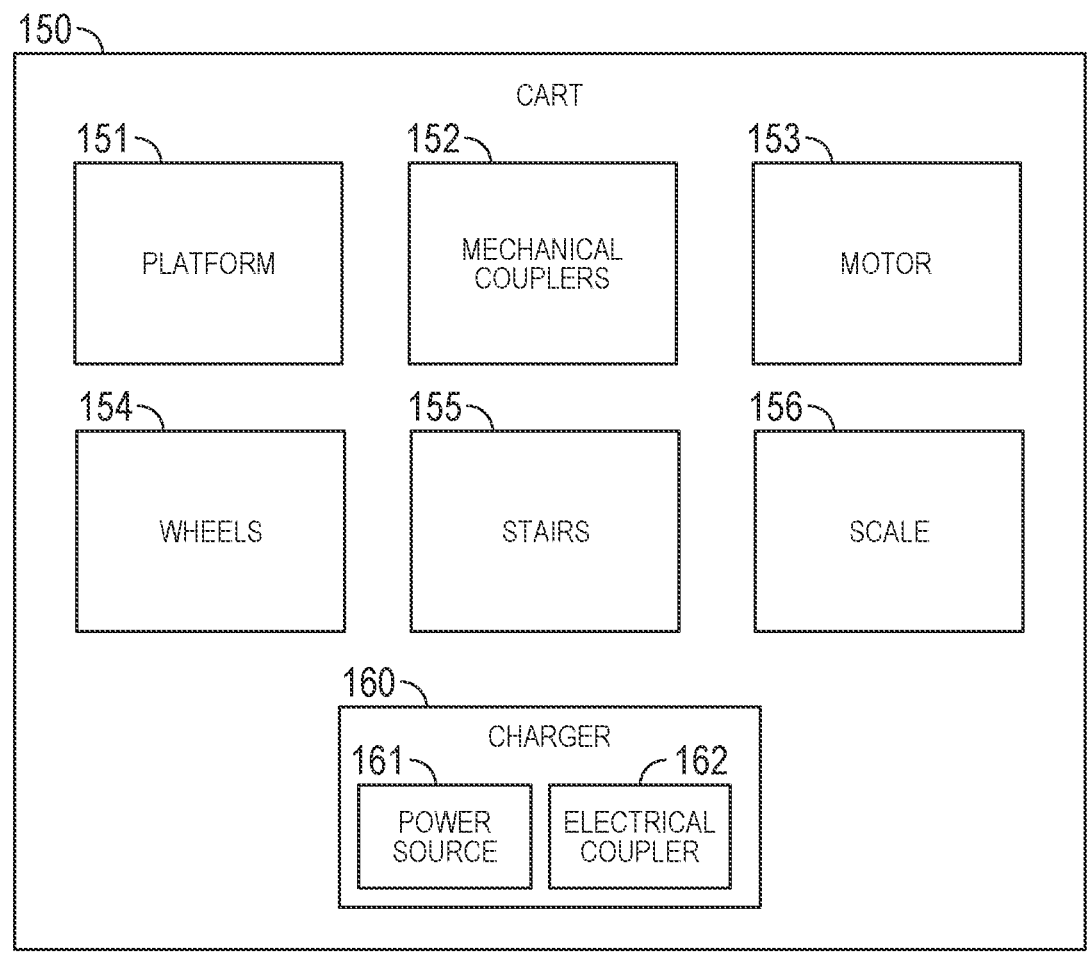
FIG. 2A-2B illustrate examples of a cart, according to various embodiments.

An example cart 150 is shown in FIG. 2A, according to embodiments. As shown, the cart 150 can include a support structure such as a platform 151. The platform 151 can include a weight-bearing surface configured to physically support one or more aircraft 112, upon which an aircraft 112 can rest. The cart 150 can further include one or more mechanical couplers 152 which may couple to the aircraft 112 to provide additional stability and support to the aircraft 112 during transit. The cart 150 can also include mobility components, such as a motor 153 (e.g., which may be powered by a power source) and/or wheels 154. The motor 153 can be coupled to the set of one or more wheels 154 and configured to cause the set of one or more wheels 154 to rotate so that the cart 150 moves (and therefore the platform 151 moves). In some embodiments, the cart 150 may include components that assist in passengers boarding the cart 150 and/or aircraft 112, such as stairs 155 and/or ladders. Components that assist in passengers boarding the cart 150 and/or aircraft 112, such as stairs 155 and/or ladders, may be retractable and extendable. For example, stairs 155 may extend for passenger loading and unloading, and may retract when the cart 150 and/or aircraft 112 are moving.

According to various embodiments, the cart 150, which may be automated, may mechanically lift and/or support the aircraft 112 (e.g., using the mechanical couplers 152 and/or platform 151), and then transport the aircraft 112 across the transition zone 115 while it is in the lifted and/or supported position. The mechanical couplers 152 can include support beams, a forklift, tension lines, hooks, mechanical contacts, or any other suitable tools for lifting (e.g., moving in vertical direction), holding, and/or moving the aircraft 112.

In some embodiments, the aircraft 112 may land directly onto the cart 150. For example, the aircraft 112 may land directly onto the platform 151. Alternatively, after the aircraft 112 has landed at the landing zone 110, the cart 150 may move to a position underneath the aircraft 112. For example, the cart 150 may drive under the aircraft 112 from behind the aircraft 112, from in front of the aircraft 112, or from any other suitable angle of approach. In some embodiments, aircraft skids may be located on the sides of the aircraft 112, so the cart 150 may not enter from the side. The cart 150 then may proceed to lift the aircraft 112. In this case, the cart 150 may not use and/or include the platform 151, and may instead couple to and lift the aircraft 112 with the mechanical couplers 152.

In some embodiments, the aircraft 112 may have landing gear that does not enable independent ground movement, such as skids. In other embodiments, the aircraft 112 can include wheels instead of skids, and the cart 150 may pull the aircraft 112 instead of lifting the aircraft 112.

According to various embodiments, the cart 150 may travel independently over various surfaces, moving from the landing zone 110 to the transition zone 115 and then to the takeoff zone 120. In other embodiments, the cart 150 may follow and/or be connected to a defined track or pathway.

As mentioned above, one or more carts 150 can transport one or more aircraft 112 between the landing zone 110 and the takeoff zone 120 through the transition zone 115. While transporting the aircraft 112, the cart 150 may also provide electrical power to recharge one or more batteries of the aircraft 112. This may advantageously improve vertiport space efficiency and time efficiency, as the transition zone 115 may be used for both re-positioning and recharging, instead of those activities happening at different times and in difference spaces.

In order to provide electrical power to recharge the electric aircraft 112, a charger 160 can be included as a component of the cart 150. Each of a plurality of carts 150 can include one of a plurality of chargers 160. A charger 160 can include a power source 161 (e.g., an on-cart battery or a wired connection to an off-cart vertiport power source) and an electrical coupler 162 that is configured to couple to and supply power to one or more batteries of the aircraft 112. Further, the cart 150 can include additional electrical couplers 162 for recharging an on-cart power source by connecting to a separate off-cart vertiport power source 161. In some embodiments, the charger's power source 161 may also provide power to the motor 153.

In one example, the electrical couplers 162 may be housed in a recessed trough of the cart 150. When the cart 150 approaches and mechanically couples to the aircraft 112, the electrical couplers 162 may automatically emerge from the cart (e.g., in a vertical direction or a horizontal direction) and connect to a charging port of the aircraft 112 without a user/operator involvement.

In some embodiments, one or more mechanical couplers 152 and one or more electric couplers 162 may be integrated into a single component that provides both mechanical support and electrical charging to the aircraft 112 through one multi-purpose coupling.

Each of the mechanical couplers 152 and the electric couplers 162 may become removably-attached to any suitable part of an aircraft 112, such as the main body of the aircraft 112, wings of the aircraft 112, and/or one or more ports or coupling points of the aircraft 112. According to various embodiments, electrical coupling points and mechanical coupling points on the aircraft 112 may be adjacent to one another, or may instead may be in distant or unrelated locations of the aircraft 112.

In further embodiments, the charger 160 may be equipped for wireless charging. Accordingly, in addition to or instead of electrical couplers 162 that physically connect to the aircraft 112, the charger 160 may include a wireless charging module that may transmit power to the aircraft 112 (e.g., to a corresponding wireless charge receiving module at the aircraft 112) without physical contact between the charger 160 and a charging module of the aircraft 112.

According to various embodiments, the cart 150 may be configured to sufficiently charge and/or completely charge one or more batteries of the aircraft 112 while traveling across the transition zone 115. An optimal cart speed may be calculated by dividing the travel distance (e.g., 20 meters) between the landing zone 110 and the takeoff zone 120 (or the width of the transition zone 115) by the time needed to charge the aircraft (e.g., 30 minutes).

As mentioned above, the cart 150 may allow passenger exchange to take place while the aircraft 112 is in transit (e.g., coupled to transport equipment and/or located within the transition zone 115). For example, a first set of one or more passengers may exit the aircraft 112 after the aircraft 112 arrives at the landing zone 110, and a second set of one or more passengers may enter the aircraft 112 before the aircraft departs from the takeoff zone 120. The cart speed may be set below a maximum threshold so that passengers may safely enter and exit the aircraft (at a slow and steady speed), even while it is being moved by the cart 150. In some embodiments, the cart 150 may have a variable speed, the speed being lowered (or stopped) for times when passengers are entering or exiting the aircraft 112.

Further, the cart 150 may additionally include a scale module 156 that may determine the total weight and/or balance (e.g., center of gravity) of the aircraft 112. For example, after a new set of passengers boards the aircraft 112 (e.g., with or without luggage), the cart 150 may use one or more on-cart scale modules 156 to calculate a new total weight and/or balance of the aircraft 112. The calculated weight and/or balance data may then be provided to the aircraft 112 (e.g., an aircraft computer) for use in the next flight. In some embodiments, the cart 150 and/or aircraft 112 may use the weight and balance information to determine needed or recommended changes to passenger and/or luggage positioning within the aircraft 112 to improve balance and weight distribution. Incorporating a scale function into the cart may advantageously eliminate the need for a separate scale, a separate process of weighing passengers and/or luggage before boarding the aircraft 112, and a separate determination of optimal passenger and/or luggage placement within the aircraft 112.

Figure 2B:
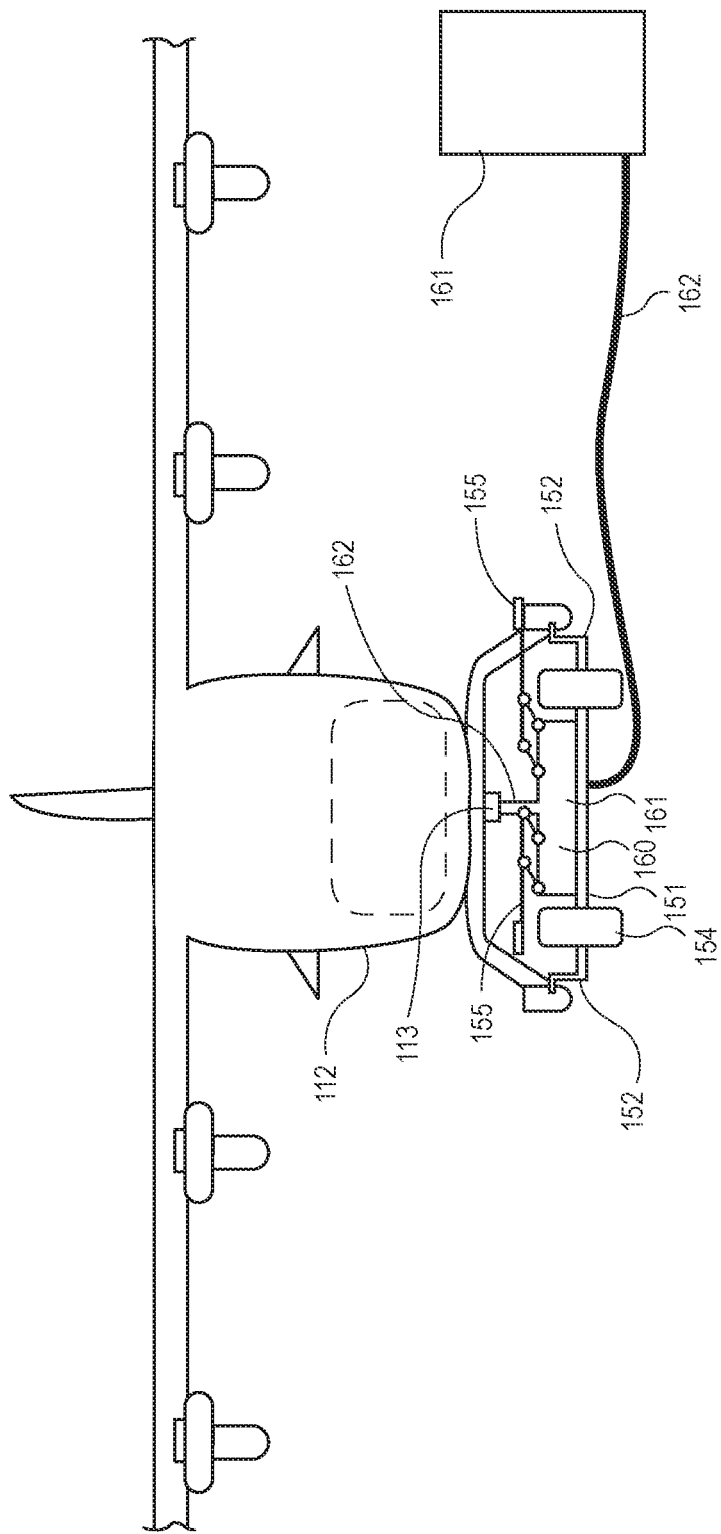

One example of a cart 150 as coupled to an aircraft 112 is shown in FIG. 2B, according to embodiments. As shown, the cart 150 can include a platform 151, mechanical couplers 152, wheels 154, stairs 155 (e.g., shown in a retracted position), and/or a charger 160. Both an on-cart power source 161 and an off-cart power source 161 are shown, although embodiments allow one or both to be included. Also, two electrical couplers 162 are shown; a cart-to-aircraft electrical coupler 162 and an off-cart power source to cart power source electrical coupler 162, although embodiments allow one or both to be included. A coupling point 113 of the aircraft 112 is illustrated. The coupling point 113 may provide a connection to one or more aircraft batteries, and may be configured for removable coupling to a corresponding electrical coupler 162 of the cart 150.

II. Vertiport Zones

Referring back to FIG. 1, the landing zone 110 can include a first space or surface (e.g., a first aircraft runway) configured to receive an incoming aircraft 112. The takeoff zone 120 can include a second space or surface (e.g., a second aircraft runway) configured to allow the aircraft 112 to depart. The landing zone 110 and the takeoff zone 120 can each support an aircraft 112, and can provide sufficient space for the aircraft 112 to land from flying and/or depart from the ground. The landing zone 110 and the takeoff zone 120 can each can include any suitable materials, such as asphalt, concrete, tarmac, wood, metal, and/or natural surface materials (e.g., grass, dirt, gravel, ice, sand, salt). Further, the landing zone 110 and/or takeoff zone 120 may include heating elements on or below the surface (e.g., to prevent ice from forming), draining systems, markings and indicators, and/or any other suitable elements.

In some embodiments, the width of the landing zone 110 and/or the takeoff zone 120 may be at least twice the size of the aircraft 112. For example, the width may be 3 meters, 5 meters, 10 meters, 20 meters, or any other suitable width. The length of the landing zone 110 and/or the takeoff zone 120 can be configured based on the space needed for accelerating to takeoff and/or decelerating when landing. For example, the length may be 10 meters, 20 meters, 30 meters, 50 meters, 100 meters, or any other suitable length.

In some embodiments, the vertiport system 105 may be configured for aircraft that utilize horizontal takeoff and landing (HTHL). For example, length of the landing zone 110 and/or the takeoff zone 120 can take the form of runways that are configured to accommodate HTHL aircraft.

In other embodiments, the vertiport system 105 may be configured for aircraft capable of vertical takeoff and landing (VTOL). In this case, less space may be needed for takeoff and landing, and the lengths of the landing zone 110 and/or the takeoff zone 120 can be reduced relative to typical runways. Instead of a runway, such a landing zone 110 and/or the takeoff zone 120 may take the form of a pad (e.g., a landing pad or a takeoff pad). For example, the shape and size (e.g., length and width) may be configured to be smaller than a typical runway, but may be at least twice the size (e.g., corresponding length or width) of the aircraft 112. Embodiments allow the landing zone 110 and/or the takeoff zone 120 to have dimension sizes of runways, pads, hybrid runway-pads, and any other suitable sizes.

Each of the landing zone 110 and the takeoff zone 120 can include three distinct regions: (1) a Touchdown and Liftoff (TLOF) area, (2) a Final Approach and Takeoff (FATO) area, and (3) a Safety Area. The TLOF can be a load-bearing, generally paved area on which the aircraft 112 lands and/or takes off. The FATO may be an area in space over which the aircraft 112 completes the final phase of the approach to a hover or a landing, and/or an area in space over which the aircraft 112 starts the initial phase of the takeoff from a position of hovering or a landing position. The TLOF may be in the centered of the FATO. The Safety Area can be an area in space surrounding the FATO that provides additional buffer space.

According to embodiments, the transition zone 115 may include at least one space or surface positioned between the landing zone 110 and the takeoff zone 120. For example, the transition zone 115 can include one or more surfaces (e.g., which may be paved) each of which can include one or more pathways, one or more platforms (e.g., which may rotate), and/or any other suitable surface that can be used when transporting a cart and/or aircraft from the landing zone 110 and the takeoff zone 120. The transition zone 115 may provide space outside of the landing zone 110 and the takeoff zone 120 for completing flights (e.g., passenger unloading), starting new flights (e.g., passenger loading), and/or resetting the aircraft 112 for a subsequent flight (e.g., relocating the aircraft, charging batteries, cleaning, etc.). The transition zone 115 may host equipment that assists in performing these tasks, such as transport equipment and/or chargers.

In the example shown in FIG. 1, the transition zone 115 includes one surface. The surface includes one elongated pathway that can simultaneously accommodate a plurality of aircraft 112 (e.g., in a single-file line), each aircraft 112 at a different point of progress across the transition zone 115. Such a surface can physically support an aircraft 112, and can include any suitable materials, such as asphalt, concrete, tarmac, wood, metal, and/or natural surface materials (e.g., grass, dirt, gravel, ice, sand, salt). The transition zone 115 can also include heating elements on or below the surface (e.g., to prevent ice from forming), draining systems, markings and indicators, and/or any other suitable elements.

In some embodiments, the width of the transition zone 115 may be similar to or slightly larger than the width of aircraft 112. For example, if the aircraft width is 10 meters, the transition zone 115 may have a width of 11 meters. The transition zone 115 may not require the same amount of buffer space as the landing zone 110 and the takeoff zone 120, as aircraft 112 may not begin a flight or finish a flight at the transition zone 115.

The length 116 of the transition zone 115 may be configured based on the time needed to charge an aircraft 112, the number of aircraft 112 desired to be accommodated on the vertiport system 105 at any given point in time, and/or the space needed for each aircraft 112 and cart 150. For example, if the vertiport system 105 is designed to accommodate a new aircraft arrival every 5 minutes, and it takes 30 minutes to charge an aircraft 112, then after the first aircraft 112 arrives and begins a charging process, five additional aircraft may arrive while the first aircraft 112 is still undergoing the charging process. If each aircraft/cart system has a length of 10 meters (e.g., including a buffer space between aircraft and/or carts), then the transition zone may be designed to have a length 116 of at least 60 meters. That would allow enough space for all six aircraft to be charging and moving between across the transition zone 115 at the same time without any delay for any of the aircraft upon arrival at the landing zone 110. Alternatively, the length 116 of the transition zone 115 in FIG. 1 may be configured based on the space available. For example, size dimensions of a building rooftop may limit the length 116 of the transition zone 115 to be 20 meters.

According to various embodiments, the transition zone 115 may be wide enough, or have sections that are wide enough, to allow one cart 150 and aircraft 112 to pass another cart 150 and aircraft 112. For example, an aircraft 112 may arrive that still has some amount of charge/power left after the previous flight, and therefore does not need the full time to under a recharge process. As a result, that aircraft 112 may become ready for a subsequent flight before another aircraft 112 that is further ahead in the line to the takeoff zone 120. Using the surplus width in the transition zone 115, whichever aircraft 112 is nearer to being sufficiently charged may be moved around one or more other aircraft 112 and thereby placed closer to the front of the line.

According to various embodiments, passengers may be loaded and unloaded from the aircraft 112 at any suitable time, which may advantageously include times when the aircraft 112 is being transported and charging so that there is no need to allocate additional space for a separate passenger exchange zone. As shown in FIG. 1, a passenger deplaning position 130 may be located in a first section of the transition zone 115, which may be the first area the cart 150 and aircraft 112 enter after the aircraft 112 arrives in the landing zone 110. Also, a passenger boarding position 135 may be located at a last section of the transition zone 115, which may be the last area the cart 150 and aircraft 112 is transported through before departing the vertiport system 105 from the takeoff zone 120. However, embodiments allow passengers to enter and/or exit the aircraft 112 at other times and positions as well. For example, when a passenger arrives at the vertiport system 105, the next available aircraft 112 may be not be at the last section of the transition zone 115 (e.g., it may be in the middle of the transition zone 115). The passenger may be allowed to board the aircraft 112 at this point, and wait inside the aircraft 112 while the cart 150 completes the charging and transporting of the aircraft 112.

The vertiport system 105 may further include one or more access portals through which passengers may enter and/or exit the vertiport system 105. For example, the vertiport system 105 may include a passenger exit point 175 and/or passenger entry point 170. According to various embodiments, the passenger exit point 175 and/or passenger entry point 170 may include any suitable type of access portal, such as stairs, escalators, elevators, and/or walkways. The access portals may connect to corridors located underneath the surface level of the vertiport system 105. For example, if the vertiport system 105 is located on the roof of a building, the passenger exit point 175 and passenger entry point 170 may be connected to lower levels of the building. If the vertiport system 305 is located on the ground, the passenger exit point 175 and passenger entry point 170 may be connected to tunnels and/or passageways underneath the ground.

In some embodiments, one or more passages (e.g., tunnels, walkways, etc.), which may be coupled to the passenger exit point 175 and/or the passenger entry point 170, may considered a part of the vertiport system 105. The one or more passages may be located underneath the takeoff zone 120, the landing zone 110, and/or the transition zone 115.

According to embodiments, the passenger exit point 175 and/or passenger entry point 170 may be located in any suitable area of the vertiport system 105. As illustrated in FIG. 1, the passenger exit point 175 may be located adjacent to the beginning of the transition zone 115, near to where the aircraft 112 and/or cart 150 may first enter the transition zone 115 from the landing zone 110. As shown, the passenger exit point 175 may thereby be conveniently located near to a passenger deplaning position 130. Also as illustrated in FIG. 1, the passenger entry point 170 may be located adjacent to the end of the transition zone 115, near to where the aircraft 112 and/or cart 150 may leave the transition zone 115 to enter the takeoff zone 120. As shown, the passenger entry point 170 may thereby be conveniently located near to a passenger boarding position 135.

In some embodiments, the passenger exit point 175 and/or passenger entry point 170 may be located within the transition zone 115. In some embodiments, the locations of the passenger exit point 175 and/or passenger entry point 170 illustrated in FIG. 1 (e.g., adjacent to the elongated surface pathway of the transition zone 115) may also be considered part of (e.g., within) the transition zone 115.

In some embodiments, an air traffic controller or an automated aircraft communication network may coordinate the arrival times of different aircraft 112. In this scenario, each arrival may be spaced apart in time (e.g., at least 1, 2, 3, 4, or 5 minutes apart) so that there is always a space available in the landing zone 110 and/or the transition zone 115 for an arriving aircraft 112. As a result, each arriving aircraft 112 may immediately become coupled to a cart 150 and moved from the landing zone 110 to the transition zone 115, as well as immediately begin charging.

In other embodiments, aircraft may be permitted to arrive even when there is not available space in the transition zone 115. In this case, the landing zone 110 may include an extra space used as a waiting/storage area (e.g., at the end of the landing zone 110). Overflow aircraft may wait in the waiting area (either with or without a cart 150) until space in the transition zone 115 and/or a cart 150 become available. Additional aircraft 112 may be able to arrive in the landing zone 110 as overflow aircraft may be located out of the way (e.g., in the waiting area).

In some embodiments, a cart 150 with the next available aircraft 112 may wait at the end of the transition zone 115 until the next passenger boards the aircraft 112, then the cart 150 may deposit the aircraft 112 in the takeoff zone 120. Alternatively, the cart 150 may deposit the aircraft into the takeoff zone 120 when finished charging, and the aircraft 112 may wait there until the next passenger arrives.

In some embodiments, if multiple aircraft 112 finish charging before the next passenger arrives, each of the multiple aircraft 112 may be deposited by their respective carts in an extra waiting/storage area of the takeoff zone 120 (e.g., at the beginning of the takeoff zone 120). As a result, the carts 150 and space in the transition zone 115 may be made available for additional arriving aircraft 112. Once the takeoff zone 120 and/or waiting area become fully occupied, additional aircraft(s) may wait in the transition zone 115, where carts 150 may stop moving toward the takeoff area 120, but may continue charging the aircraft 112.

In some embodiments, if space at the vertiport system 105 is fully occupied with aircraft 112, the vertiport system 105 may cause one or more aircraft 112 to depart from the takeoff zone 120 even if there are no departing passengers. For example, it may be considered a high priority to allow an incoming aircraft 112 with arriving passengers to land, so some present aircraft 112 may be instructed to depart without passengers. In some embodiments, such a non-occupied aircraft 112 may be distributed to another vertiport system that is low on aircraft 112 but has demand from passengers who would like to depart. Embodiments, allow aircraft 112 to be automatically re-distributed among multiple different vertiports based on real-time demand, time of day, or any other suitable consideration.

As described above, the cart 150 together with the transition zone 115 may efficiently combine the space and time needed for (1) resetting the aircraft 112 from the landing zone 110 to the takeoff zone 120, (2) recharging the aircraft 112, and (3) exchanging passengers.

III. Charging Stations

As discussed above with respect to FIG. 1, the chargers 160 may take various forms and be in various locations that allow the aircraft 112 to be charged while located in the transition zone 115 and/or while coupled to the transport equipment. As already discussed, in some embodiments, the chargers 160 can be disposed on the carts 150. In other embodiments, one or more chargers 160 can instead be disposed at one or more fixed locations on one or more surfaces of the transition zone 115.

For example, one or more chargers can be installed in fixed locations on the ground. The transport equipment can still be embodied as including carts that couple to aircraft 112 to physical transport the aircraft 112 across the transition zone 115. However, instead of equipping the carts 150 with aircraft-charging capabilities and components, the carts 150 can be configured to temporarily stop at a one or more ground-based chargers 160 for a certain amount of time. When stopped at a charger 160, the aircraft 112 can become electrically coupled to the charger 160 and undergo some or all of a recharging process.

In some embodiments, a surface of the transition zone 115 can include an elongated pathway with a plurality of charging station positions, which can be arranged in a row along the pathway, consecutively. For example, a charger 160 can be installed at each aircraft 112 position on the transition zone 115 shown in FIG. 1. A cart 150 can iteratively move an aircraft 112 from one charging station to the next. For example, the cart 150 can stop at a first charger 160 for a first time period, and the aircraft 112 can become electrically coupled to a first charger 160 and undergo a first portion of a battery recharging process. Then, either after a certain predetermined amount of time, or in response to an event (e.g., a new aircraft arrived or another aircraft departed and therefore each waiting aircraft can move forward a position), the aircraft 112 can decouple from the charger 160 and the cart 150 can move the aircraft 112 to a second position with a second charger 160. At the second position, the cart 150 can again stop and allow the aircraft 112 to connect to the second charger 160. The cart 150 and aircraft 112 can proceed iteratively from station to station in this manner until the aircraft 112 is fully charged, sufficiently charged, and/or the cart 150 deposits the aircraft 112 into the takeoff zone.

A surface-disposed charger 160 can include a power source 161 (e.g., a central power source for the vertiport system 105 or a local battery) and one or more electrical couplers 162 that are configured to couple to and supply power to one or more batteries of the aircraft 112. In one example, the electrical couplers 162 may be housed in a console. When the cart 150 and aircraft 112 come within a certain range of the console, the electrical couplers 162 may automatically emerge from the console (e.g., in a vertical direction or a horizontal direction) and connect to a charging port of the aircraft 112. In further embodiments, the charger 160 may be equipped for wireless charging. Accordingly, in addition to or instead of electrical couplers 162 that physically connect to the aircraft 112, the charger 160 may include a wireless charging module that may transmit power to the aircraft 112 (e.g., to a corresponding wireless charge receiving module at the aircraft 112) without physical contact between the charger 160 and a charging module of the aircraft 112.

Embodiments allow any of the vertiport systems discussed herein or illustrated in the Figures to include chargers that are disposed on carts or chargers that are installed in fixed ground positions.

IV. Vertiport Configuration: Zones in Z-Shape

According to various embodiments, additional compact vertiport efficiencies can be achieved through efficient arrangement and configuration of the various zones of the vertiport system 105. For example, as shown in FIG. 1, the landing zone 110, transition zone 115, and takeoff zone 120, in combination, may form an efficient z-shape for the vertiport system 105. This z-shaped configuration may minimize the energy and time needed to reset an aircraft 112 for a subsequent flight by minimizing and aircraft's travel distance between landing and subsequent takeoff.

As shown, the end of the landing zone 110, where the aircraft 112 may most naturally come to a stop, may be the part of the landing zone 110 that is adjacent to and/or connected to the transition zone 115. This connection may happen at the true end of the landing zone 110, or near the end (e.g., within 2 meters, 5 meters, 10 meters, or 20 meters) of the landing zone 110.

Similarly, the beginning of the takeoff zone 120, from where the aircraft 112 may typically begin the takeoff process, may be the part of the takeoff zone 120 that is adjacent to and/or connected to the transition zone 115. This arrangement allows the aircraft 112 to be positioned for takeoff without any unnecessary travel along the takeoff zone 120. This connection may happen at the true beginning of the takeoff zone 120, or near the beginning (e.g., within 2 meters, 5 meters, 10 meters, or 20 meters) of the takeoff zone 120.

This combination of end-to-beginning connections provides the shortest, most efficient way to connect the landing zone 110 to the takeoff zone 120. For example, in contrast, if the beginning (instead of the end) of the landing zone 110 were connected to the transition zone 115, the aircraft 112 (e.g., via the cart 150) may, after landing, have to travel back down the length of the landing zone 110 before entering the transition zone 115. This may inefficiently take more time and energy to reset the aircraft 112 for a subsequent flight, and may occupy the landing zone 110 for a longer time which may prevent additional aircraft from landing. While not being the most efficient configuration, such configurations (e.g. the beginning (instead of the end) of the landing zone 110 were connected to the transition zone 115 or similar configurations) are also within the scope of the present disclosure as the configuration may be warranted by real estate restrictions, zoning requirement, etc.

As shown in FIG. 1, the landing zone 110 (e.g., a first surface) may be oriented in a first direction, the takeoff zone 120 (e.g., a second surface) may be oriented in a second direction, and the first and second directions can parallel or otherwise similar. For example, it may be desired to orient both the landing zone 110 and the takeoff zone 120 such that they both oppose the prevailing wind direction.

The transition zone 115 (e.g., a third surface) may be oriented in a third direction. As shown in FIG. 1, the third direction can be angled relative to the first and second directions. In some embodiments, the third direction may be perpendicular to the first and second directions. The angle between the transition zone 115 and the other zones may be determined based on the shape of the overall space allotted for the vertiport system 105.

In some embodiments, the transition zone 115 can allow travel in either direction (e.g., the carts 150 can travel in either direction). Further, the landing zone 110 and the takeoff zone 120 may be able to switch designations (e.g., the landing zone 110 becomes the takeoff zone 120, and vice versa). This can be useful in certain situations, such as if the wind is moving opposite the typical direction. It may be desired to land and takeoff into the wind. Accordingly, if the wind is blowing from behind the landing zone 110 and the takeoff zone 120 (e.g., back to front), the landing zone 110 and the takeoff zone 120 can switch designations, and traffic across the transitions zone 115 can switch directions.

Embodiments of the invention allow additional configurations to be used that may achieve similar benefits as the z-shape configuration. For example, in contrast with the z-shape configuration where the aircraft 112 lands and takes off with the same directional heading, the takeoff zone 120 may instead be oriented in the opposite direction of (e.g., antiparallel to) the landing zone 110, so that aircraft takes off with a heading opposite to the landing heading. This may resemble a u-shape. The u-shape configuration enables efficient resetting of aircraft 112 across a short transition zone 115 in a manner similar to that of the z-shape configuration. However, a u-shape configuration may fit well into a typical rectangular-shaped real estate space. While the u-shape may make efficient use of rectangular spaces, in some situations, wind direction may make a u-shape configuration undesirable or impractical, as it is typically preferred for aircraft to both takeoff and land against the prevailing wind direction. In some embodiments, such as for VTOL aircraft, wind direction may not be a concern or may be less of a concern.

The configuration and arrangement of the landing zone 110, transition zone 115, and takeoff zone 120 may be modified on a case-by-case basis, and may be determined based on a number of external factors, such as the shape of the available real estate land or surface, surrounding obstacles (e.g., buildings, hills, mountains, wind currents), surrounding flight regulations (e.g., restricted airspace or regulated flight paths), aircraft capability (e.g., vertical vs horizontal takeoff and landing), etc. Accordingly, depending on the external factors, the optimal configuration may involve, relative to the configuration shown in FIG. 1, modifying the sizes (e.g., lengths) of one or more zones, modifying the orientations and/or relative angles of one or more zones, and/or modifying the relative positions and/or connection points of one or more zones. As one example, in a case where a long-narrow surface strip is available, the landing zone 110, transition zone 115, and takeoff zone 120 may all be lined-up in the same direction in one long, continuous strip.

Figure 3:
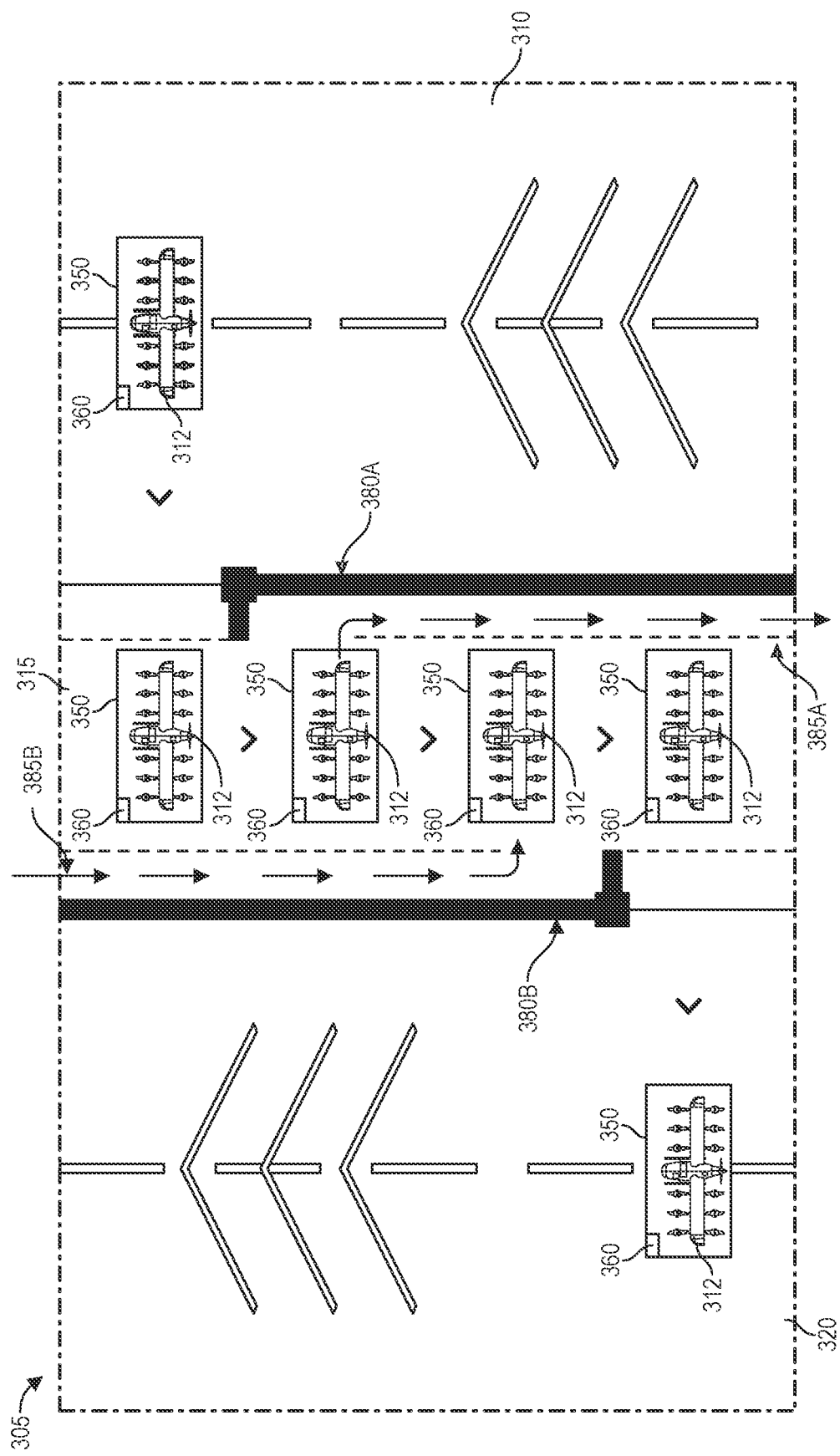
FIG. 3 illustrates an example of a vertiport system with an alternative configuration of zones, according to various embodiments.
Figure 4:
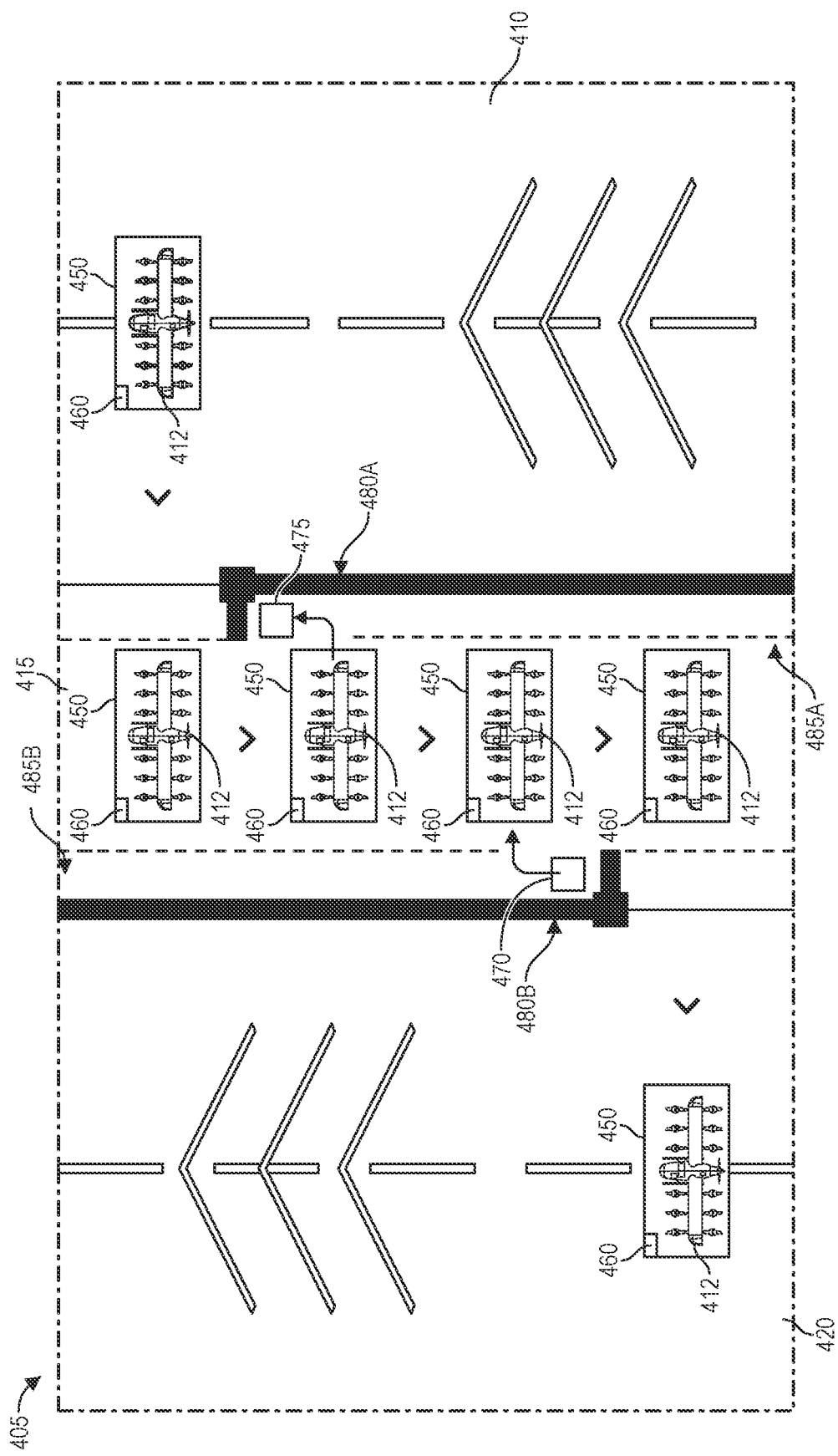
FIG. 4 illustrates an example of a vertiport system with alternative entry and exit points, according to various embodiments.

While configurations like the z-shape and the u-shape enable a short transition zone 115, a short transition zone 115 may limit the number of aircraft that may be accommodated (e.g., placed on carts and charged) at a given point in time. Accordingly, in some embodiments, alternative configurations may be used to extend the transition zone 115 so that additional aircraft 112 may be accommodated. For example, the transition zone 115 may be lengthened by making any suitable number of turns, bends, switchbacks, or other diversions on the way to the takeoff zone 120. Also, the landing zone 110 and the takeoff zone 120 can be further staggered in any direction so that the transition zone 115 travels further to connect them (e.g., use non-90 degree angles). Alternatively, instead of staggering the landing zone 110 and the takeoff zone 120 as shown in FIG. 1, the landing zone 110 and the takeoff zone 120 may be parallel to one another and lined up with one another (e.g., as in the u-shaped configuration, except here landing and takeoff directions may be the same). In this case, the transition zone 115 may primarily travel in an equal and opposite direction to the takeoff/landing direction (e.g., downward in FIG. 1) in order to travel from the end of the landing zone 110 to the beginning of the takeoff zone 120. This may both elongate the transition zone 115 and at the same time create an efficient use of available space in a rectangular real estate area or a rectangular rooftop. Examples of such a vertiport configuration are shown below with respect to FIGS. 3-5. In FIGS. 3-5, the transition zones 115 is straight, relatively short, and antiparallel to the landing zone 110 and the takeoff zone 120. If a longer transition zone 115 is desired, it can be angled (e.g., not antiparallel) relative the landing zone 110 and the takeoff zone 120, and/or include any suitable number of twists and turns (e.g., based on the width of the available real estate space), as mentioned above.

While not shown in FIG. 1, the vertiport system 105 may also include a return path for carts that have dropped-off an aircraft 112 at the takeoff zone 120. As an example, the return path may be adjacent to the transition zone 115, but with empty carts traveling in the opposite direction to the carts in the transition zone 115. In some embodiments, the return path may involve twists and turns in order to elongate the path. This may take advantage of any unused real estate space, may enable to the vertiport system 105 to store extra carts, and/or may provide carts with space/time to recharge on-cart cart power sources 161 (e.g., by stopping at and connecting to a vertiport ground power supply).

V. Vertiport Configuration: Parallel Lanes

FIG. 3 illustrates an example of a vertiport system 305 with an alternative configuration of zones. As shown, the landing zone 310 and the takeoff zone 320 can be substantially aligned (e.g., vertically aligned from the perspective of FIG. 3). For example, the beginnings of the landing zone 310 and the takeoff zone 320 can be vertically aligned and/or the endings of the landing zone 310 and the takeoff zone 320 can be vertically aligned. The landing zone 310 and the takeoff zone 320 may also be oriented in the same or similar directions (e.g., parallel).

The transition zone 315 may be adjacent to both the landing zone 310 and the takeoff zone 320, and located between the landing zone 310 and the takeoff zone 320. The transition zone 315 can also be aligned with the landing zone 310 and/or the takeoff zone 320 (e.g., vertically aligned from the perspective of FIG. 3). Further, the transition zone 315 may be oriented in an opposite direction relative to (e.g., antiparallel to) the landing zone 310 and/or the takeoff zone 320.

The aircraft landing and takeoff directions (e.g., first and second directions) may both be oriented from bottom to top of the landing zone 310 and the takeoff zone 320 (e.g., upward from the perspective of FIG. 3). In order to travel from the end of the landing zone 310 to the beginning of the takeoff zone 320, the aircraft may be transported (e.g., via carts) across the transition zone 315 in an equal and opposite (e.g., antiparallel) direction (e.g., a third direction) relative to the takeoff/landing direction (e.g., downward in FIG. 3).

The zone arrangement of the vertiport system 305 shown in FIG. 3 may simultaneously provide efficient and direct transport from the landing zone 310 and the takeoff zone 320, allow both the landing and takeoff directions to be oriented in the same direction (e.g., against the wind), and create a rectangular shape which may fit well into a rectangular space (e.g., a rectangular land plot or rooftop).

The vertiport system 305 may further include one or more protective barriers (e.g., 380A and 380B) and/or one or more walkways (e.g., 385A and 385B). The barriers 380A and 380B can take the form of walls, fences, gaps, textured ground, or any other suitable type of barrier or indicator. The first barrier 380A may be positioned along at least some of a first border between the transition zone 315 and the landing zone 310. The second barrier 380B may be positioned along at least some of a second border between the transition zone 315 and the takeoff zone 320.

The walkways 385A and 385B can take the form of paved stationary pathways, moving pathways (e.g., conveyer belt), escalators, stairs, or any other suitable type of passenger corridor. The walkways 385A and 385B can be positioned between and adjacent to both of the transition zone 315 and respective barriers 380A and 380B.

According to various embodiments, separate walkways 385A and 385B can be used for entering passengers and exit passengers. The first barrier 380A and the first walkway 385A can guide deplaning passengers through the vertiport system 305 from an aircraft 312 to an exit area or exit portal. The second barrier 380B and the second walkway 385B can guide boarding passengers through the vertiport system 305 from an entry area or entry portal to an aircraft 312. The barriers 380A and 380B and walkways 385A and 385B can prevent passengers from entering the landing zone 310 and/or takeoff zone 320 on foot. The barriers 380A and 380B can surround the transition zone 315, and the barriers 380A and 380B may include gaps at one or more ends to allow aircraft 312 to enter and exit the transition zone 315 from the landing zone 310 and takeoff zone 320.

FIG. 4 illustrates another example of a vertiport system 405. The vertiport system 405 shown in FIG. 4 shares a number of similarities to the vertiport system 305 shown in FIG. 3. However, the vertiport system 405 shown in FIG. 4 further includes a passenger exit point 475 and a passenger entry point 470. As indicated, a deplaning passenger can proceed directly from an aircraft 412 to the conveniently located passenger exit point 475 (e.g., stairs, elevator, escalator, etc.). Similarly, a boarding passenger can proceed directly from the conveniently located passenger entry point 470 (e.g., stairs, elevator, escalator, etc.) to an aircraft 412. This can advantageously reduce the amount of space and time that the passengers spend on foot within the vertiport system 405, as passengers may not need to travel across the length of a walkway adjacent to the transition zone 415. As shown, the passenger exit point 475 and the passenger entry point 470 are located at ends of respective walkways and protective barriers. However, embodiments allow the passenger exit point 475 and the passenger entry point 470 to be located at central areas of respective walkways, or at any other suitable locations.

Figure 5A:
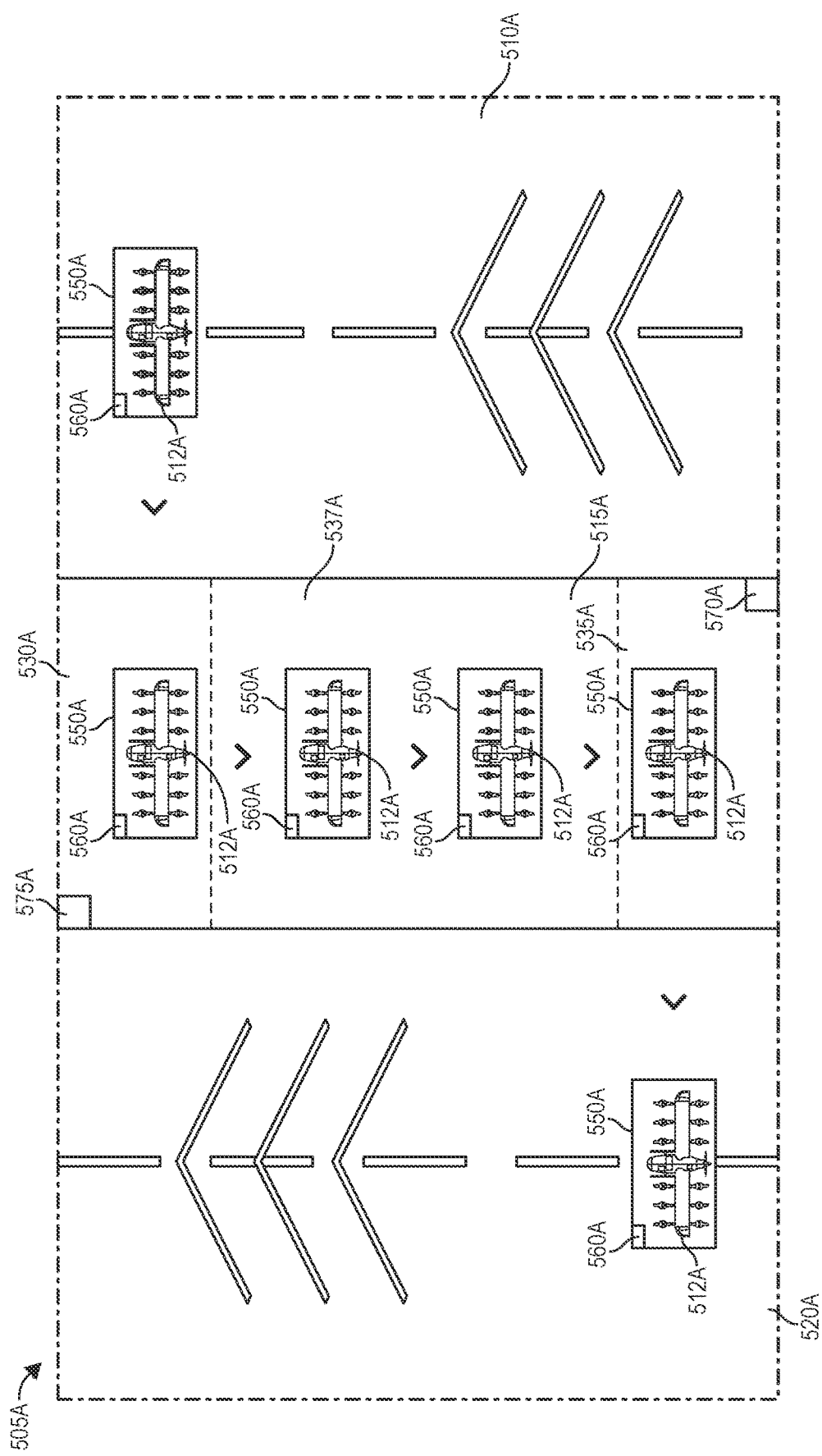
FIG. 5A illustrates an example of a vertiport system with separate areas for passenger exchange and aircraft reset, according to various embodiments.

FIG. 5A illustrates another example of a vertiport system 505A. The vertiport system 505A shown in FIG. 5A shares a number of similarities to the vertiport system 405 shown in FIG. 4. However, in contrast with FIG. 4, the vertiport system 505A shown in FIG. 5A positions the passenger exit point 575A and the passenger entry point 570A at the beginning and end, respectively, of the transition zone 515A. Further, a passenger deplaning zone 530A can be limited to a first portion of the transition zone 515A at the beginning of the transition zone 515A. Similarly, a passenger boarding zone 535A can be limited to a third portion of the transition zone 515A. The passenger exit point 575A can be located within the passenger deplaning zone 530A (which can also be referred to as an egress point), and the passenger entry point 570A can be located within the passenger boarding zone 535A (which can also be referred to as an ingress point).

This arrangement can contain passenger exchange areas to limited portions of the transition zone 515A, and therefore make available the rest of the transition zone 515A for other activities. For example, a second portion of the transition zone 515A located between the passenger deplaning zone 530A and the passenger boarding zone 535A can be used for cleaning the aircraft 512A, preconditioning the aircraft cabin environment, recharging, maintenance, and/or otherwise preparing or resetting aircraft 512A for a subsequent flight. This second portion of the transition zone 515A can be referred to as a reset zone 537A. In some embodiments, the reset zone 537A may be maximized so that a ground crew can have as much time as possible to reset and prepare the aircraft 512A.

In some embodiments, recharging can be performed only within the reset zone 537A. In other embodiments, recharging can take place in other zones as well, such as the passenger deplaning zone 530A and the passenger boarding zone 535A. For example, charging can begin when the aircraft 512A becomes electrically coupled to a cart (e.g., which can happen in the landing zone 510A).

Figure 5B:
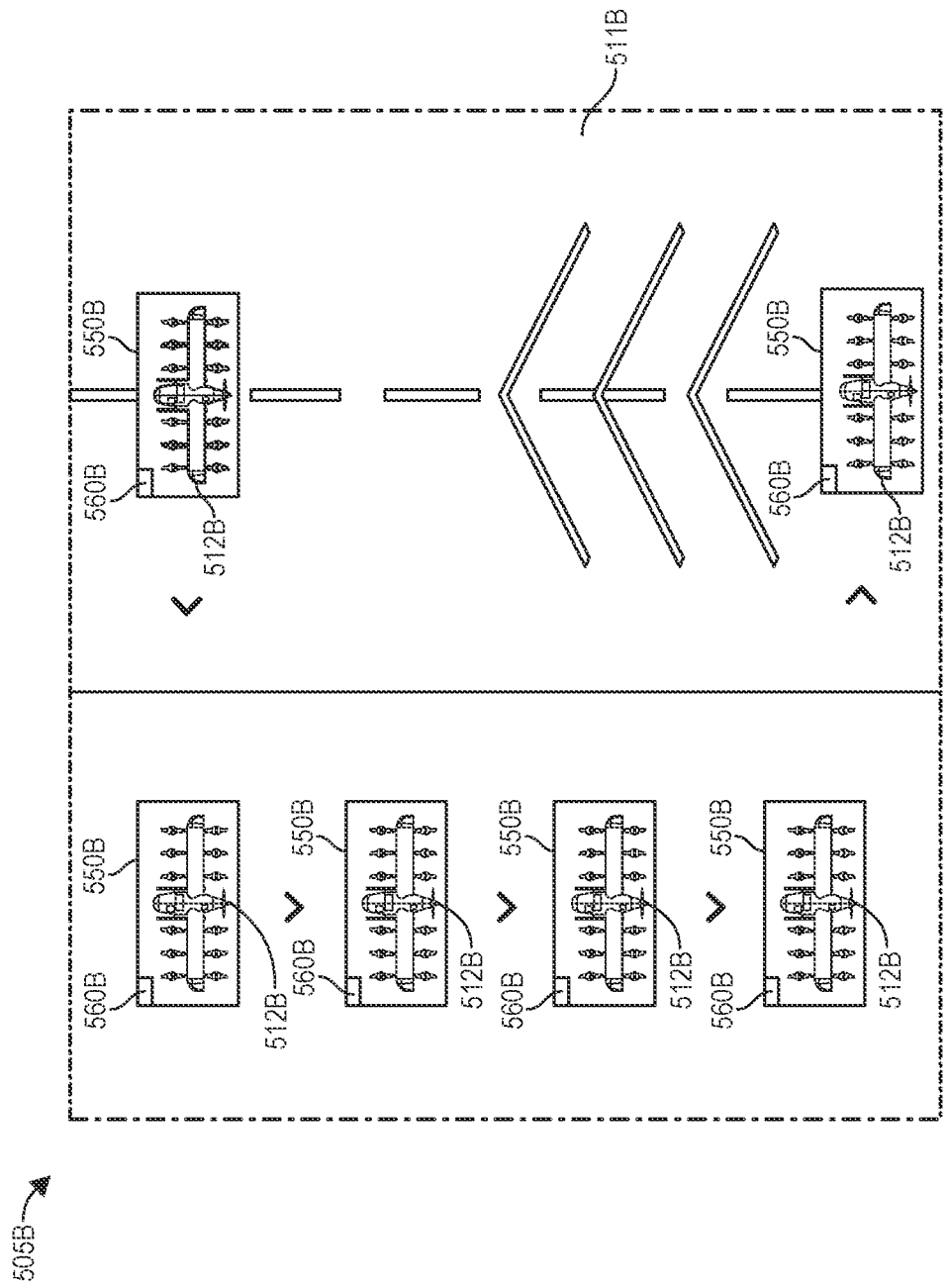
FIG. 5B illustrates an example of a vertiport system with a combined takeoff and landing zone, according to various embodiments.

FIG. 5B illustrates another example of a vertiport system 505B. The vertiport system 505B shown in FIG. 5B is more compact due to combining the landing zone and the takeoff zone into a single unified multipurpose surface used for both landing and takeoff. In other words, the landing zone and the takeoff zone may be in the same location. This unified zone can be referred to as a landing and takeoff zone 511B. In this case, the transition zone 515B may be a surface that connects the end of a runway to the beginning of the same runway. The transition zone 515B may be positioned adjacent to and oriented antiparallel to the landing and takeoff zone 511B, as shown in FIG. 5B. In some embodiments, the landing and takeoff zone 511B can include curves or bends, or have any other suitable shape pathway. In other embodiments, the transition zone 515B may be a loop that brings the cart 550B and/or aircraft 512B back to the same point on the runway after completing a recharge and/or passenger exchange. The transition zone 515B may still be considered positioned between the landing zone and the takeoff zone even when the landing zone and the takeoff zone occupy the same space, because that space (e.g., a single runway) may first be used as the landing zone (e.g., receive an aircraft), and then may be used as the takeoff zone (e.g., allow aircraft to depart) after the aircraft 512B travels across the transition zone 515B.

VI. Vertiport Configuration: One-Stop Pathway

FIG. 6 illustrates another example of a vertiport system 605. The vertiport system 605 shown in FIG. 6 shares a number of similarities to the vertiport system 305 shown in FIG. 3. However, in the vertiport system 605 shown in FIG. 6, the transition zone 615 includes a surface with multiple pathways 616A, 616B, 616C, and 616D.

As indicated in FIG. 6, each of the pathways 616A, 616B, 616C, and 616D can connect directly from the landing zone 610 to the takeoff zone 620. As a result, each aircraft 612 can reach the takeoff zone 620 by moving across just one of the pathways 616A, 616B, 616C, and 616D, as opposed to traveling down the entire transition zone 615 (e.g., as in FIG.

3). After entering the takeoff zone 620, the aircraft 612 may move to a bottom or starting area of the takeoff zone 620. Also, each aircraft 612 can move directly from the landing zone 310 into an available space at any of the available pathways 616A, 616B, 616C, and 616D (e.g., instead of all aircraft entering at the top of the transition zone 615 from the top/end of the landing zone 610).

As opposed to the elongated pathway in FIG. 3, each of the pathways 616A, 616B, 616C, and 616D can be relatively short (e.g., about the size of an aircraft). Each pathway may be configured to accommodate one aircraft 612 at a time. In this case, an aircraft 612 can remain in one place for the duration of the charging process, passenger exchange process, and/or other reset processes.

Embodiments allow the chargers to be disposed on carts or separately on the transition zone 615, as discussed above. In some embodiments, each of the pathways 616A, 616B, 616C, and 616D may include a fixed charging station. This may be suitable for the configuration of FIG. 6, because each aircraft 612 may couple to a single ground-based charger and complete a charging process without having to move to another ground-based charger.

The separation of the transition zone 615 into multiple separate pathways can eliminate a single-file queue of aircraft 612, which may cause delays or backups. For example, each aircraft 612 can take as much time charging as needed without causing delays or interruptions for other aircraft 612.

VII. Vertiport Configuration: Multiple Stacked Sets of Zones

Figure 7:
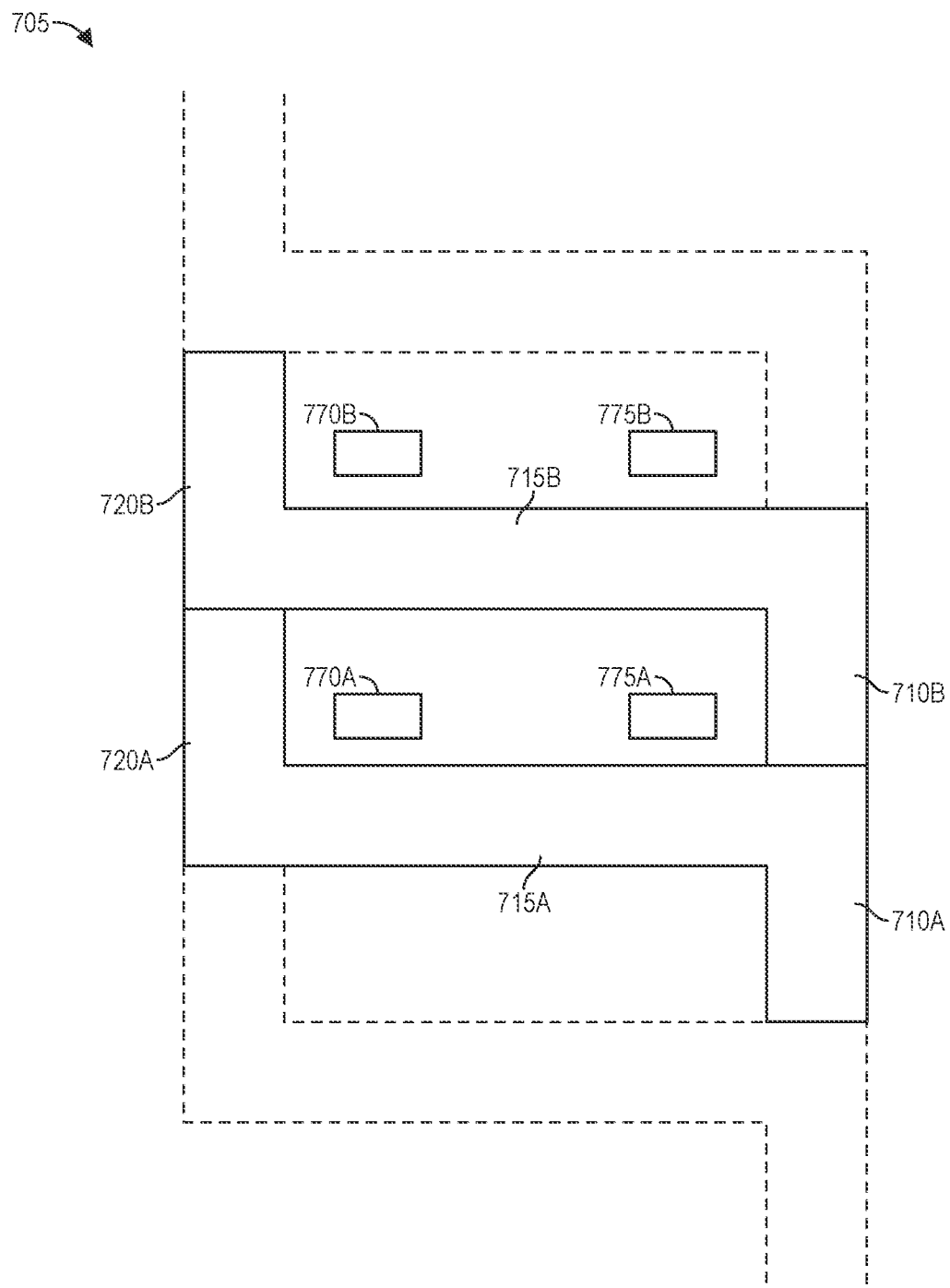
FIG. 7 illustrates an example of a vertiport system with multiple sets of zones, according to various embodiments.

FIG. 7 illustrates an example of a vertiport system 705 that includes multiples of each zone. As shown, multiple versions of each zone can be stacked together into one area. This example uses multiple stacks sets of the z-shape configuration as shown in FIG. 1, but embodiments allow other configurations to be stacked as well (e.g., the configuration shown in FIG. 3).

A first set of zones including a first landing zone 710A, transition zone 715A, and/or takeoff zone 720A may be positioned adjacent to a second set of zones including a second landing zone 710B, transition zone 715B, and/or takeoff zone 720B. While two sets of zones (e.g., landing, transition, and takeoff) are shown, any suitable number of sets of zones can be included and stacked above or below the zones shown in FIG. 7 to create one combined vertiport system 705.

The two sets of zones can be arranged relative to one another in any suitable manner. In one example, the two sets of zones are aligned (e.g., horizontally aligned from the perspective of FIG. 7). For example, as shown in FIG. 7, the first landing zone 710A may be oriented in the same direction as and/or horizontally aligned with the second landing zone 710B, such that the end of the first landing zone 710A is adjacent to and/or connects to the beginning of the second landing zone 710B. Similarly, the first takeoff zone 720A may be oriented in the same direction as and/or horizontally aligned with the second takeoff zone 720B, such that the end of the first takeoff zone 720A is adjacent to and/or connects to the beginning of the second takeoff zone 720B. Further, the first transition zone 715A may be parallel to the second transition zone 715B.

Including multiple stacked zones may more fully utilize the available space while maintaining the advantages of the efficient zone configurations described above (e.g., z-shape). For example, a z-shaped zone configuration may not utilize some of a rectangular real estate space (e.g., a rectangular plot of land or a rectangular rooftop). However, several z-shaped configurations stacked together may better utilize a rectangular space.

Additionally, the presence of multiple landing zones, takeoff zones, and transition zones, may enable a greater frequency of aircraft arrivals, departures, and recharging sessions. For example, if a single set of zones (e.g., landing, transition, and takeoff) may receive and process one aircraft per five minutes, and there are five sets of zones in the vertiport system 705, then the vertiport system 705 as a whole may receive one aircraft per minute.

According to various embodiments, the vertiport system 705 (e.g., via a vertiport computer and/or communication system) may instruct an approaching aircraft to land in a certain landing zone (e.g., 710A or 710B) based on any suitable criteria. For example, the landing zones may be cycled iteratively (e.g., first use landing zone 710A, then landing zone 710B, then another landing zone if included, and so forth). Alternatively, the vertiport system 705 may utilize whichever set of zones (e.g., landing, transition, and takeoff) that currently has the shortest wait-time (e.g., for the passengers to exit the aircraft, or for the aircraft to be recharged and reset for subsequent use).

According to various embodiments, one or more sets of zones may share certain components and/or zones. For example, a plurality carts may be shared by the first set of zones and the second set of zones. In such an embodiment, the carts may be distributed intelligently among different sets of zones, based on where there is need. Alternatively, different carts may be dedicated to different sets of zones. For example, a first plurality of carts may be provided for the first set of zones, configured to physically transport a first plurality of aircraft across the first transition zone 715A from the first landing zone 710A to the first takeoff zone 720A. Similarly, a second plurality of carts may be provided for the second set of zones, configured to physically transport a second plurality of aircraft across the second transition zone 715B from the second landing zone 710B to the second takeoff zone 720B.

Additionally, in some embodiments, the different landing zones 710A and 710B may be combined into one continuous landing zone. Multiple transition zones 715A and 715B may lead away from different parts of the single continuous landing zone. Similarly, the different takeoff zones 720A and 720B may be combined into one continuous takeoff zone.

The vertiport system 705 may include one or more passenger exit points (e.g., 775A and 775B), as well as one or more passenger entry points (e.g., 770A and 770B). According to embodiments, the passenger exit points 775A and 775B and passenger entry points 770A and 770B may be located in any suitable area of the vertiport system 705, such as in-between sets of zones to take advantage of space that is not occupied by a zone. As illustrated in FIG. 7, passenger exit points 775A and 775B may be located adjacent to the beginning of a corresponding transition zone (e.g., 715A and 715B), near to where an aircraft and/or cart may first enter the transition zone from a landing zone (e.g., 710A and 710B). Also as illustrated in FIG. 7, passenger entry points 770A and 770B may be located adjacent to the end of a corresponding transition zone (e.g., 715A and 715B), near to where an aircraft and/or cart may leave the transition zone to enter a takeoff zone (e.g., 720A and 720B).

VIII. Vertiport Configuration: Interconnected Sets of Zones

Figure 8:
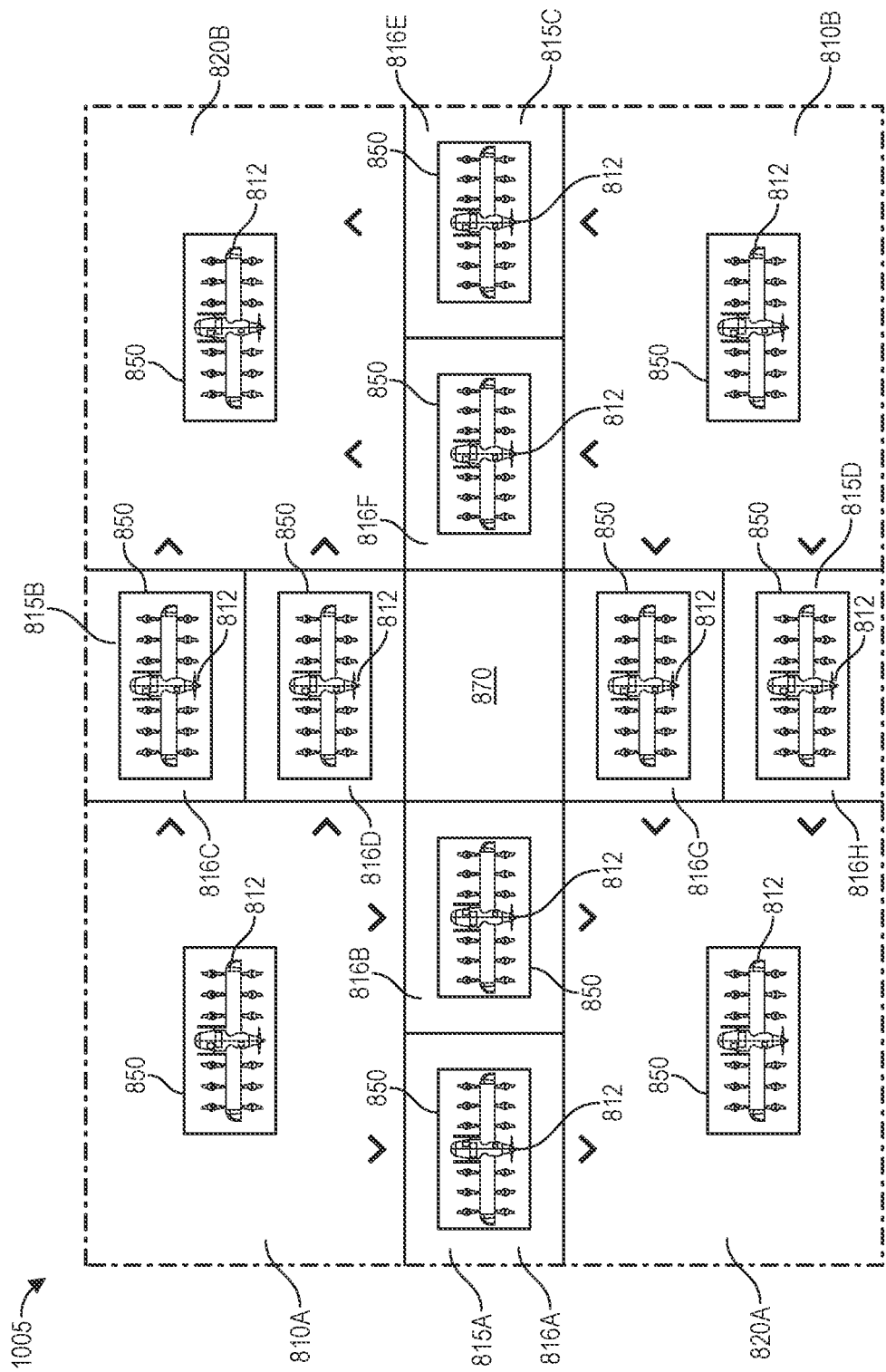
FIG. 8 illustrates an example of a vertiport system with interconnected sets of zones, according to various embodiments.

FIG. 8 illustrates an example of a vertiport system 805 with interconnected sets of zones, according to various embodiments. As shown, multiple versions of each zone can be interconnected in a single vertiport system 805. This example uses transition zones with multiple single-aircraft pathways, similar to the transition zone 615 shown in FIG. 6, but embodiments allow other configurations to be interconnected as well (e.g., the configurations shown in FIGS. 1, 3, 4, and 5).

The vertiport system 805 can include two separate landing zones 810A-B (e.g., two separate surfaces), two separate takeoff zones 820A-B (e.g., two separate surfaces), and four separate transition zones 815A-D (e.g., four separate surfaces). The landing zones 810A-B and takeoff zones 820A-B can each be located in a respective corner of the rectangular-shaped vertiport system 805, and each of the transition zones 815A-D can be located in between and connected to a different pair of location zones and takeoff zones. As a result, the transition zones 815A-D, taken together, can form a plus-shape.

In one embodiment, the two landing zones 810A-B are positioned in opposite corners (e.g., top-left and bottom-right), and the two takeoff zones 820A-B are positioned in the remaining opposite corners (e.g., top-right and bottom-left). Each of these corner zones are separated by the four transition zones 815A-D. Each of the transition zones 815A-D provides a unique connecting route from one of the landing zones 810A-B to one of the takeoff zones 820A-B. The geometrical arrangement enables each of the landing zones 810A-B to be connected by the transition zones 815A-D to both takeoff zones 820A-B (instead of the other landing zone). As a result, a landing aircraft be have multiple options for movement within the vertiport system 805, as it may be able to move to either of the takeoff zones 820A-B.

In some embodiments, the vertiport system 805 may comprise one large, continuous surface. The different zones (which may be described as different surfaces) may be part of the same surface but separated by markings or other indicators.

In this example, each of the transition zones 815A-D includes a surface, and each surface includes two pathways (e.g., two of the eight pathways 816A-H), although embodiments allow each transition zone surface to include any suitable number of pathways. Each pathway connects one of the landing zones 810A-B to one of the takeoff zones 820A-B. This provides a landing aircraft with even more options for movement within the vertiport system 805. For example, an aircraft 812 that lands in the first landing zone 810A may have four different options of positions to move to next. The aircraft 812 may move into either the first transition zone 815A or the second transition zone 815B, and within those options the aircraft 812 may move into the first pathway 816A, the second pathway 816B, the third pathway 816C, or the fourth pathway 816D. Depending on which transition zone the aircraft 812 uses, the aircraft 812 can subsequently move to the first takeoff zone 820A or the second takeoff zone 820B.

Thus it can be seen that the interconnected zones of the vertiport system 805 provide routing flexibility when receiving, resetting, and sending off aircraft 812. This can assist in efficiently coordinating a plurality of aircraft that may be simultaneously arriving, resetting, and/or departing at any given time.

Similar to FIG. 6, in FIG. 8, each aircraft 812 (e.g., via a cart) can move directly from one of the landing zones 810A-B into an available pathway in one of the adjacent transition zones 815A-D. Each of the pathways 816A-H may be configured to accommodate one aircraft 812 at a time. An aircraft 812 can remain in one place for the duration of the charging process, passenger exchange process, and/or other reset processes. Then, the aircraft 812 can move directly into to the nearest of the takeoff zones 820A-B.

Also, as mentioned above with respect to FIG. 6, the vertiport system 805 of FIG. 8 allows fixed chargers to be placed at each of the pathways 816A-H. Because each aircraft 812 can charge while stationary in one location, the carts may not need to be equipped with charging equipment. Instead, an aircraft 812 can be coupled to fixed charging equipment located within a designated charging area in a pathway 816A-H of a transition zone 815A-D. Simplifying the carts in this way may provide a more resilient and efficient vertiport system 805.

The vertiport system 805 may provide at least some similar benefits to those described above with respect to FIG. 7. For example, the vertiport system 805 can create an efficient use of all available space in a rectangular real estate area or a rectangular rooftop. Also, with this arrangement, carts can be shared and distributed based on demand. Alternatively, separate sets of carts can be dedicated to each pairing of landing zone to transition zone (e.g., four sets). Further, the multiple landing zones 810A-B and takeoff zones 820A-B can enable a higher frequency of aircraft exchange, as multiple aircraft can land and/or takeoff simultaneously, and the landing zones 810A-B and takeoff zones 820A-B can otherwise be operated simultaneously. Additionally, this arrangement may be well-suited for VTOL aircraft which may not require an elongated runway but can function with smaller square-shaped landing pads and take-off pads.

A passenger entry/exit area 870 can be located in the center of the vertiport system 805. The passenger entry/exit area 870 can be similar to the passenger exit point 175 and/or the passenger entry point 170 described above with respect to FIG. 1. However, here, the passenger entry/exit area 870 can be one unified access portal for both entrance and exit. Alternatively, two different pathways for entrance and exit, respectively, can be located adjacent to one another in the same area 870.

In some embodiments, each of the landing zones 810A-B and takeoff zones 820A-B may be at least twice the size (e.g., length and width) of an aircraft 812, while a pathway 816A-H of a transition zone 815A-D may have a same or similar size as an aircraft 812. Accordingly, each of the landing zones 810A-B and takeoff zones 820A-B may be twice the size of each of the pathways 816A-H. For example, each of the landing zones 810A-B and takeoff zones 820A-B may have a length equal to the length of two pathways 816A-H and/or a width equal to the width of two pathways 816A-H. As a result, two pathways 816A-H (e.g., with chargers) may conveniently fit in between each landing zone and takeoff zone.

While two pathways (e.g., with charging stations) per transition zone are shown in the FIG. 8, embodiments of the invention allow each of the transition zones to include any suitable number of pathways and/or chargers (e.g., 1, 2, 3, 4, 5, 10, etc.).

IX. Method for Alternating Zones

FIG. 9 illustrates an exemplary method and schedule for alternating the use of various zones of the vertiport system 805, according to some embodiments.

In the table shown in FIG. 9, the columns represent time periods. For example, the first column labeled "1" represents a first time period, the second column labeled "2" represents a second time period, and so forth. Each time period may have the same duration, according to some embodiments. For example, each time period may have a duration of 15 minutes. Other amounts of time can be used (e.g., 1 minutes, 5 minutes, 10 minutes, 20 minutes, 30 minutes, 45 minutes, 1 hour).

In the table shown in FIG. 9, the rows represent different locations. For example, the rows include both landing zones 810A-B, both takeoff zones 820A-B, and each pathway 816A-H of each transition zone 815A-D.

As mentioned above, multiple aircraft can arrive and be processed by the vertiport system 805 simultaneously. Each aircraft may spend a certain amount of time in each location. For example, each aircraft may spend up to four time periods in a given pathway in order to sufficiently charge aircraft batteries and/or exchange passengers. In the table shown in FIG. 9, each cell shows the location of a plurality of aircraft across a set of time periods 1-13.

As shown, two aircraft can arrive at two different landing zones at the same or similar times. Those two aircraft can then be moved to a pathway with a charging station (e.g., or while attached to a charging cart), where they will pause and charge (e.g., for a duration of 4 time periods). Once finished charging, an aircraft can be moved into a suitable takeoff zone and then depart.

As a specific example, aircraft 1 and 2 both arrive landing zones 810A and 810B, respectively, at time period 1. Then they are moved into pathways 816A and 816E, respectively, at time period 2. They remain at pathways 816A and 816E through time period 5. Then, at time period 6, they are moved into takeoff zones 820A and 820B, respectively, from which they can depart before time period 7. While aircraft 1 and 2 are charging and/or exchanging passengers, additional aircraft 3-10 arrive. Aircraft 3-8 are each moved into one of the other available pathways 816B, 816C, 816D, 816F, 816G, and 81611. Once aircraft 1 and 2 move out of pathways 816A and 816E, leaving them vacant, aircraft 9 and 10 can be moved into those pathways at time period 6.

It may be preferred to spread the usage of the takeoff zones 820A and 820B by sending two simultaneously-arriving aircraft in different directions. For example, as shown, aircraft 1 is sent to pathway 816A which leads to takeoff zone 820A, while aircraft 2 is sent to pathway 816E which leads to takeoff zone 820B. That way, if both aircraft finish recharging at the same time (which they do in this example), they can both be immediately moved into separate takeoff zones instead of competing for the same takeoff zone.

X. Vertiport Configuration: Carousel

Figure 10:
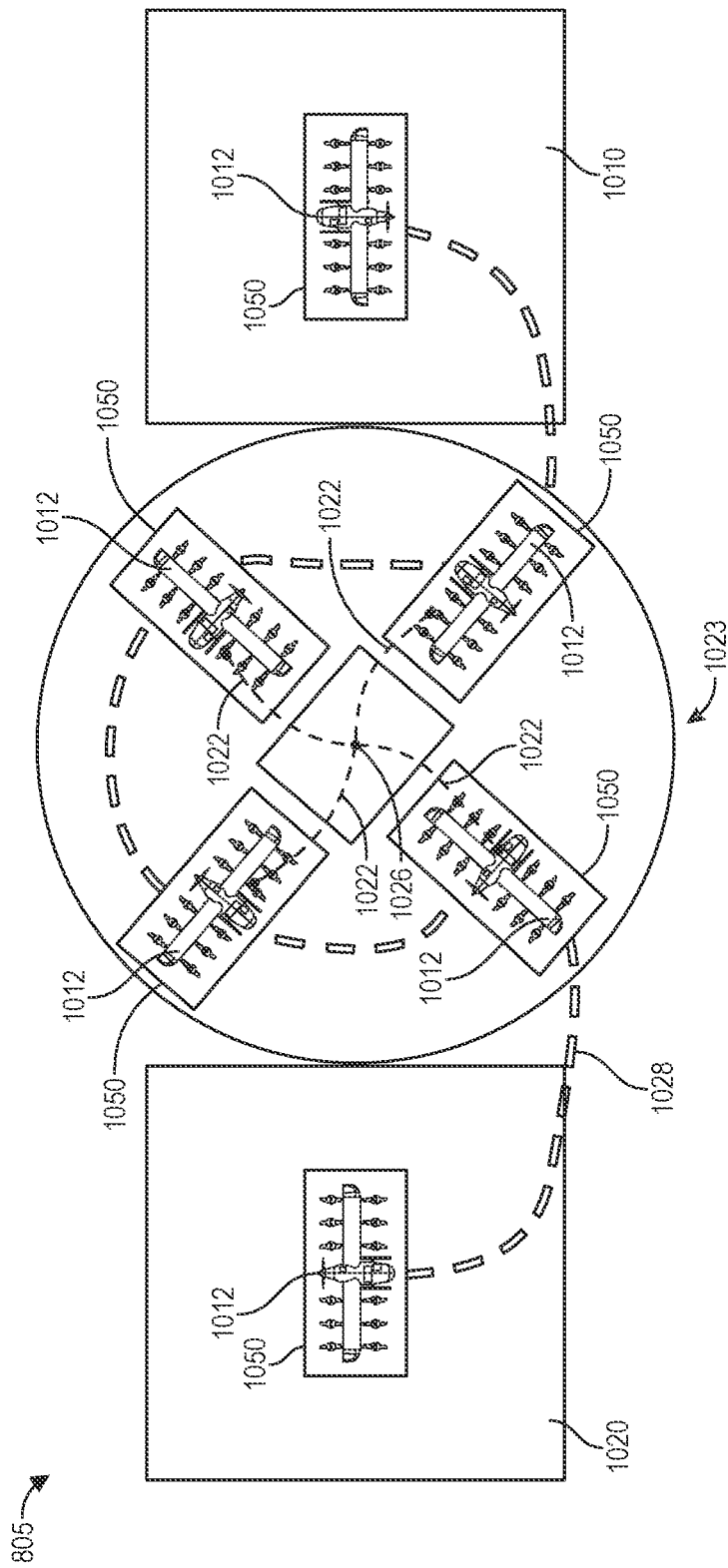
FIG. 10 illustrates an example of a carousel-style vertiport system, according to various embodiments.

FIG. 10 illustrates an example of a carousel-style vertiport system 1005. In this example, instead of a stationary, elongated pathway (e.g., as shown in FIGS. 1 and 3-5), the surface of the transition zone can take the form of a circular platform 1023. The circular platform 1023 can be configured to physically rotate (for example, counter-clockwise). Due to the rotation, aircraft 1012 and/or coupled carts 1050 located on edges of the circular platform 1023 can be transported from the landing zone 1010 on a first side of the circular platform 1023 to the takeoff zone 1020 on a second side of the circular platform 1023.

The circular platform 1023 can be coupled to rotationally driven by a motor. The circular platform can be a flat surface that is configured to physically support one or more aircraft 1012 simultaneously while rotating. Embodiments allow the platform to take other shapes besides a circle, such as an oval, a rectangle, a hexagon, an octagon, or any other suitable shape.

The transport equipment can still include carts 1050, as shown in FIG. 10. The carts 1050 can be configured to move the aircraft 1012 from the landing zone 1010 to the circular platform 1023, and later from the circular platform 1023 to the takeoff zone 1020. As shown, an aircraft 1012 can arrive at the landing zone 1010 and become coupled to and/or supported by a cart 1050. An aircraft 1012 can land directly on top of a cart 1050. The aircraft 1012 will then be transported by the cart 1050 onto the circular platform 1023. For example, the cart 1050, which may be self-propelled or moved by a moving track in the landing zone 1010, can move or be moved over from the landing zone 1010 to the circular platform 1023. Once at the circular platform 1023, the cart 1050 may rest on the circular platform 1023 without being connected to the circular platform 1023, or alternatively may physically attach to the circular platform 1023. At that point, rotation of the circular platform 1023 can continue moving the cart 1050 and aircraft 1012 toward the takeoff zone 1020. Thus, the cart 1050 and circular platform 1023 may together cause an aircraft 1012 to travel the indicated route 1028 from the landing zone 1010 to the takeoff zone 1020. In addition to being part of the transition zone, the circular platform 1023 can also be considered part of the transport equipment, as it assists in movement of the aircraft 1012.

As mentioned above, chargers can be installed on the carts 1050 or installed in other location at the transition zone. As illustrated in FIG. 10, the chargers may be coupled to the circular platform 1023 of the transition zone. Electrical couplers 1062 (e.g., components of the chargers) can extend from a center area 1026 (e.g., the central axis) of the circular platform 1023, via an opening in the circular platform 1023 or from a console fixture, for example. The electrical couplers 1022, which may take the form of wires or cables, can couple an aircraft 1012 to a power source (e.g., which may be located at, within, or underneath the circular platform 1023), and thereby charge the aircraft battery or batteries. This can take the form of a single charger with multiple electrical couplers. In other embodiments, separate chargers (e.g., power sources and/or electrical couplers) can be distributed around the circular platform 1023 at different locations, such as around the edge of the circular platform 1023.

The circular platform 1023 can rotate while the aircraft battery is being recharged. As a result, the aircraft 1012 can be transported along the route 1028 while charging occurs.

The circular platform 1023 can rotate, for example, counter-clockwise. Once the circular platform 1023 has rotated far enough (and/or charging is complete), the aircraft 1012 can detach from the electrical coupler 1022 and then the cart 1050 can move or be moved into the takeoff zone 1020. In some embodiments, the circular platform 1023 may rotate 270 degrees, 180 degrees, 90 degrees, or any other suitable rotational distance (e.g. clockwise or counter-clockwise) before the aircraft 1012 and/or cart 1050 depart. Once the aircraft 1012 is at the takeoff zone 1020, the aircraft 1012 can depart by initiating flight. The now available position on the circular platform 1023 can be filled by another cart and/or aircraft once that position rotates back to be aligned with the landing zone 1010. In some embodiments, an aircraft 1012 may stay on the platform 1023 for one or more additional revolutions in order to have more charging time, to wait for passengers, or for any other suitable purpose.

The circular platform 1023 may rotate at any suitable speed, such as completing 90 degrees of rotation in 15 minutes, or otherwise stated as one hour per complete revolution. The circular platform 1023 may temporarily stop and/or slow down when a cart 1050 is entering or exiting the circular platform 1023, according to some embodiments. Alternatively, the circular platform 1023 can continuously rotate without stopping and/or slowing. As a further alternative, the circular platform 1023 may undergo iterative rotation. For example, the circular platform 1023 may pause for a certain time interval (e.g., 15 minutes), then rotate a certain distance (e.g., 45 degrees, 90 degrees, etc.) in order to advance to a next position, and then stop for another time interval (e.g., another 15 minutes).

When the aircraft 1012 and/or cart 1050 first arrive onto the circular platform 1023, an electrical coupler 1022 at the circular platform can be coupled to the aircraft 1012, so that the aircraft can become coupled to and charged by a power source in order to begin a battery charging process while the aircraft is being moved. This can happen during a first time period (e.g., with a duration of 15 minutes). The aircraft 1012 may be allowed to arrive at the circular platform 1023 at any time during the first time period, or it may only be allowed to arrive at the beginning or end of the first time period (e.g., when an available position on the circular platform 1023 becomes aligned with the landing zone 1010). At a second time period (e.g., with a duration of 15 minutes), the circular platform can rotate, thereby transporting the aircraft 1012 toward the takeoff zone. The circular platform 1023 may rotate from a first position into a second position. This can include a rotation of a certain amount, such as a 90 degree rotation. In some embodiments, the circular platform 1023 rotates this amount via continuous rotation over a certain time period (e.g., 15 minutes). In other embodiments, the circular platform 1023 iteratively performs a rotation after a certain time period has already elapsed (e.g., 15 minutes). At a third time period (e.g., with a duration of 15 minutes), the circular platform 1023 can rotate from the second position to a third position (e.g., another 90 degrees in the same direction). At a third time period (e.g., with a duration of 15 minutes), the circular platform 1023 can rotate from the third position to a fourth position (e.g., another 90 degrees in the same direction). At this point, the circular platform may have rotated 270 degrees total from the first position to the fourth position, and the aircraft 1012 can be in a location that is aligned with the takeoff zone 1020. The aircraft can then be disconnected from the electrical coupler 1022 (e.g., after completing a re-charging process) and moved (e.g., by the cart 1050) to the takeoff zone 1020, and the aircraft 1012 can depart. Then, the circular platform 1023 may rotate from the fourth position to a fifth position (e.g., another 90 degrees in the same direction). In some cases, the fifth position may be the same as the first position. In other words, the circular platform 1023 can finish one full rotation cycle at this point. At this point, this same area of the circular platform 1023 can be used to transport another aircraft. Additional aircraft may already be located on the circular platform 1023, but at different locations on the circular platform.

Four carts 1050 and four aircraft 1012 are shown being simultaneously charged (e.g., by electrical couplers 1022) and transported by the circular platform 1023, but embodiments allow the circular platform 1023 to support, charge, and transport any suitable number of carts 1050 and/or aircraft 1012 at the same time.

In some embodiments, the ends of the electrical couplers 1022 located at the center 1026 of the circular platform 1023 may not rotate with the circular platform 1023, as the electrical couplers 1022 may be unplugged from one aircraft and move to the next after each iterative movement of the circular platform 1023. Accordingly, slip rings may not be necessary for the electrical couplers 1022, according to some embodiments. In other embodiments, an electrical coupler 1022 may remain coupled to the same aircraft 112 while the circular platform 1023 rotates (e.g., one electric coupler for the aircraft's entire charging process), and a slip ring can be used with the electrical coupler 1022.

The combination of the circular platform 1023 and electrical couplers 1022 protruding from the center area 1026 can advantageously centralize and simplify the charging components and cable routing. For example, instead of equipping multiple carts with their own batteries and cables, or having multiple carts that maintain connections to a central charging system, FIG. 10 can provide a single charging system with multiple couplers coming from a central area. Because of the spatial arrangement of a rotating circular platform 1023, each aircraft 1012 can be simultaneously connected to the charging system while moving toward the takeoff zone 1020 without needing to move the charging system itself.

In some embodiments, each of the carts 1012 illustrated in FIG. 10 can instead take the form of stationary platforms. In this case, other separate carts or transportation mechanisms (e.g., lifts or cranes) can move an aircraft from one platform to another (e.g., when two platforms are located adjacent to another due to the current rotational position of the circular platform 1023).

XI. Method for Resetting Aircraft

Figure 11:
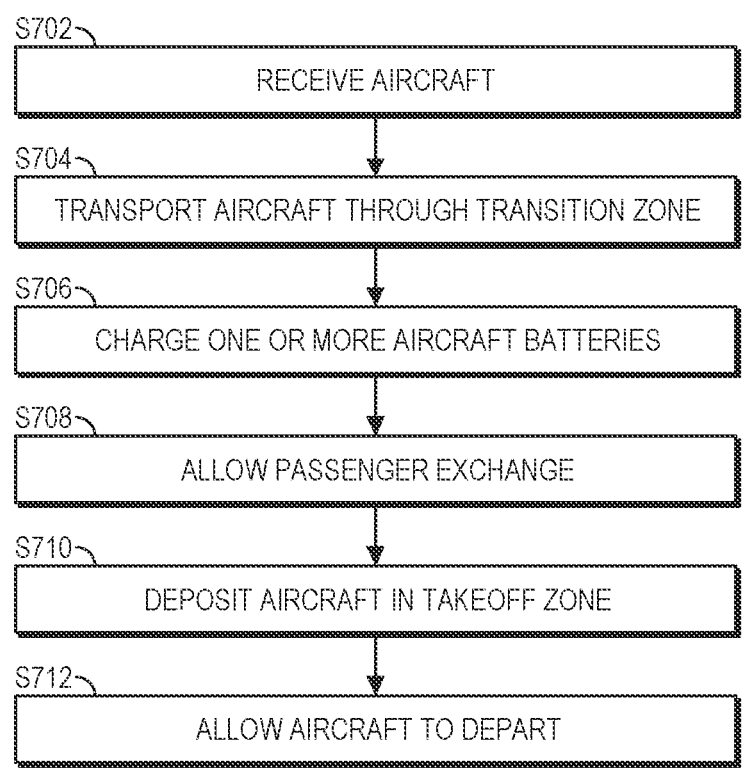
FIG. 11 illustrates a method for resetting an aircraft, according to various embodiments.

FIG. 11 illustrates a flowchart of steps performed by an exemplary vertiport system for resetting an aircraft.

At step S702, the vertiport system may receive an aircraft. The aircraft may land at a landing zone of the vertiport system.

At step S704, the vertiport system may transport the aircraft through a transition zone. For example, a cart of the vertiport system may mechanically couple to and/or lift the aircraft, and begin transporting the aircraft away from the landing zone toward a takeoff zone via the transition zone. The cart may travel continuously, or iteratively from station to station in the transition zone. The cart may travel at a continuous speed or a variable speed. Eventually the cart can enter the takeoff zone from the transition zone.

In some embodiments, the vertiport system may include a rotating platform. The aircraft can be transported from the landing zone onto an adjacent edge of the rotating platform (e.g., via cart), and then the platform may rotate (e.g., continuously or iteratively) until the aircraft is adjacent to the takeoff zone. Then, the aircraft can be transported from the rotating platform to the takeoff zone (e.g., via cart).

At step S706, the vertiport system may charge one or more aircraft batteries. The charging step S706 can happen at the same time and/or overlap with the transporting step S704. A transport cart (e.g., from S704) may include a charger, which can electrically couple to the aircraft batteries. The charger can recharge the one or more aircraft batteries while the cart transports the aircraft.

In other embodiments, one or more chargers may be disposed on a surface of the transition zone. For example, a set of chargers may be placed in sequence along an elongated pathway, or one charger can be placed in a short pathway. The cart may stop at one or more of the chargers, allow the aircraft to electrically couple to a charger for a period of time, and then move the aircraft along to a next charger (or into the takeoff zone).

In other example, one or more chargers are disposed on the rotating platform. The aircraft may electrically couple to a charger on the rotating platform and receive electrical charging while the platform rotates. The aircraft may then decouple from the charger before being transported off the platform and into the transition zone.

At step S708, the vertiport system may allow passenger exchange. The passenger exchange step S708 can happen at the same time and/or overlap with the transporting step S704 and/or the charging step S706. Arriving passengers can exit the aircraft and then exit the vertiport system. Departing passengers can enter the vertiport system and then enter the aircraft. The aircraft may be transported in a slow (e.g., at a speed that is less than a predetermined maximum speed) and steady manner so that passenger exchange can happen safely. In some embodiments, a cart transporting the aircraft may slow down or come to a stop to allow passenger exchange.

At step S710, the vertiport system may deposit the aircraft in a takeoff zone. For example, after the one or more aircraft batteries have been fully (or adequately) recharged, after the aircraft has been transported across the transition zone, and/or after passenger exchange has been completed, the aircraft may be placed in the takeoff zone for takeoff. This can include mechanically and/or electrically decoupling from the aircraft. In some embodiments, a cart may then leave the area and return to the landing zone to pick up another aircraft.

At step S712, the vertiport system may allow the aircraft to depart. The aircraft may takeoff and fly to another destination and/or vertiport system.

Embodiments allow the process to be performed for multiple aircraft simultaneously. For example, multiple aircraft can arrive in sequence, each aircraft can be coupled to a different cart and/or placed on different positions of a rotating platform, and each aircraft can be transported and recharged. Each aircraft can be located in a different place at any given moment and be processed in a staggered manner.

Embodiments of the invention advantageously enable a compact vertiport system that efficiently uses available space and time. For example, a transition zone may be used to accomplish the tasks of (1) moving an aircraft from a landing zone to a takeoff zone, (2) recharge an aircraft power source (or otherwise refuel an aircraft), and (3) exchange passengers. As a result, activities that typically use three different spaces and that are performed separately at three different times may now be performed at the same time within a one allotted area.

XII. Additional Embodiments

According to some embodiments, a system comprises a landing zone; a takeoff zone; and a transition zone including at least one surface positioned between the landing zone and the takeoff zone; transport equipment configured to physically transport a plurality of aircraft simultaneously across the transition zone from the landing zone to the takeoff zone, and configured to allow passenger exchange at each of the plurality of aircraft while each of the plurality of aircraft is coupled to the transport equipment and located at the transition zone; and a plurality of chargers, wherein each charger of the plurality of chargers is configured to electrically charge a battery of an aircraft from the plurality of aircraft while the aircraft is coupled to the transport equipment and located at the transition zone, and wherein each charger of the plurality of chargers includes: a power source; and an electrical coupler coupled to the power source, the electrical coupler configured to couple to and supply power to the battery of the aircraft.

In further embodiments, the landing zone is a first landing zone, the takeoff zone is a first takeoff zone, the transition zone is a first transition zone, the at least one surface is a first surface, the plurality of aircraft is a first plurality of aircraft, and the system further comprises: a second landing zone; a second takeoff zone; a second transition zone including a second surface positioned between the second landing zone and the second takeoff zone; wherein the transport equipment includes: a first plurality of carts configured to physically transport the first plurality of aircraft across the first surface from the first landing zone to the first takeoff zone; and a second plurality of carts configured to physically transport a second plurality of aircraft across the second surface from the second landing zone to the second takeoff zone.

In further embodiments, a beginning of the first transition zone is adjacent to an end of the first landing zone, an end of the first transition zone is adjacent to a beginning of the first takeoff zone, the first landing zone is oriented in a first direction, the first takeoff zone is oriented in a second direction that is parallel to the first direction, the first transition zone is oriented in a third direction that is perpendicular to the first direction and the second direction, wherein a beginning of the second transition zone is adjacent to an end of the second landing zone, an end of the second transition zone is adjacent to a beginning of the second takeoff zone, the second landing zone is oriented in the first direction, the second takeoff zone is oriented in the second direction, the second transition zone is oriented in the third direction, the end of the first landing zone is adjacent to a beginning of the second landing zone, and the end of the first takeoff zone is adjacent to a beginning of the second takeoff zone.

In further embodiments, the system further includes a third transition zone including a third surface positioned between the first landing zone and the second takeoff zone, wherein the first plurality of carts are further configured to physically transport the first plurality of aircraft across the third surface from the first landing zone to the second takeoff zone; and a fourth transition zone including a fourth surface positioned between the second landing zone and the first takeoff zone, wherein the second plurality of carts are further configured to physically transport the second plurality of aircraft across the fourth surface from the second landing zone to the first takeoff zone.

In further embodiments, the first surface includes a first set of at least two pathways from the first landing zone to the first takeoff zone, wherein the second surface includes a second set of at least two pathways from the second landing zone to the second takeoff zone, wherein the third surface includes a third set of at least two pathways from the first landing zone to the second takeoff zone, and wherein the fourth surface includes a fourth set of at least two pathways from the second landing zone to the first takeoff zone.

In further embodiments, each of the first set of at least two pathways is configured to accommodate one aircraft at a time, wherein each of the second set of at least two pathways is configured to accommodate one aircraft at a time, wherein each of the third set of at least two pathways is configured to accommodate one aircraft at a time, and wherein each of the fourth set of at least two pathways is configured to accommodate one aircraft at a time.

In further embodiments, the first landing zone has a size that is at least twice the size of each of the first set of at least two pathways.

In further embodiments, the first landing zone, the first takeoff zone, the second landing zone, the second takeoff zone, the first transition zone, the second transition zone, the third transition zone, and the fourth transition zone, taken together, form a rectangular shape, wherein the first landing zone, the first takeoff zone, the second landing zone, and the second takeoff zone each occupy a respective corner of the rectangular shape, wherein the first landing zone and the second landing zone occupy a first set of opposite corners, and wherein the first takeoff zone and the second takeoff zone occupy a second set of opposite corners.

In further embodiments, the at least one surface is in a form of a circular platform configured to physically support the plurality of aircraft simultaneously, and wherein the transport equipment includes a motor coupled to the circular platform and configured to rotate the circular platform.

In further embodiments, the transport equipment further includes a plurality of carts, each cart of the plurality of carts being configured to physically transport one of the plurality of aircraft from the landing zone to the circular platform.

In further embodiments, the plurality of chargers are disposed at one or more fixed locations on the circular platform.

According to some embodiments, a method comprises: receiving, by a system, an aircraft at a landing zone; physically transporting, by the system, the aircraft from the landing zone across a transition zone to a takeoff zone; while transporting the aircraft, electrically charging, by the system, one or more batteries of the aircraft; while transporting the aircraft, allowing passenger exchange to take place at the aircraft; depositing, by the system, the aircraft at the takeoff zone; and allowing, by the system, the aircraft to depart from the takeoff zone.

In further embodiments, physically transporting the aircraft includes mechanically coupling, by a cart of the system, to the aircraft, and wherein depositing the aircraft at the takeoff zone includes mechanically decoupling, by the cart of the system, from the aircraft.

In further embodiments, allowing the passenger exchange to take place at the aircraft includes physically transporting the aircraft at a speed that is less than a predetermined maximum speed.

While the invention has been described with reference to specific embodiments, those skilled in the art with access to this disclosure will appreciate that variations and modifications are possible.

It should be understood that all numerical values used herein are for purposes of illustration and may be varied. In some instances, ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure may be modified or omitted and that other elements not shown or described may be added.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A system comprising:
a landing zone located on a building rooftop and including a first runway configured to accommodate horizontal landing;
a takeoff zone located on the building rooftop and including a second runway configured to accommodate horizontal takeoff;
a transition zone located on the building rooftop and including at least one surface positioned between the landing zone and the takeoff zone, wherein an end of the first runway is positioned adjacent to a beginning of the transition zone, and an end of the transition zone is adjacent to a beginning of the second runway, the landing zone is oriented in a first direction, the takeoff zone is oriented in a second direction that is parallel to the first direction, the transition zone is oriented in a third direction that is perpendicular to the first direction and the second direction;
transport equipment configured to physically transport a plurality of aircraft simultaneously across the transition zone from the landing zone to the takeoff zone, and configured to allow passenger exchange at each of the plurality of aircraft while each of the plurality of aircraft is coupled to the transport equipment and located at the transition zone; and
a plurality of chargers, wherein each charger of the plurality of chargers is configured to electrically charge a battery of an aircraft from the plurality of aircraft while the aircraft is coupled to the transport equipment and located at the transition zone, and wherein each charger of the plurality of chargers includes:
a power source; and
an electrical coupler coupled to the power source, the electrical coupler configured to couple to and supply power to the battery of the aircraft.

2. The system of claim 1, further comprising:
a passage underneath one or more of the takeoff zone, the landing zone or the transition zone; and
at least one passenger entry point adjacent to the transition zone or within the transition zone, the passenger entry point coupled to the passage.

3. The system of claim 1, wherein the at least one surface includes at least one pathway, and the transport equipment includes a plurality of carts configured to physically transport the plurality of aircraft simultaneously across the at least one pathway from the landing zone to the takeoff zone.

4. The system of claim 3, wherein each cart of the plurality of carts is configured to physically transport one aircraft at a time, and wherein each cart of the plurality of carts is located at a different position in the transition zone at any given point in time.

5. The system of claim 3, wherein the plurality of chargers are disposed on the plurality of carts such that each of the plurality of carts includes a charger from the plurality of chargers, such that each cart from the plurality of carts is configured to simultaneously physically transport the aircraft and electrically charge the battery of the aircraft.

6. The system of claim 5, wherein each cart of the plurality of carts includes a platform configured to physically support the aircraft.

7. The system of claim 6, wherein each cart of the plurality of carts further includes at least one mechanical coupler configured to move in a vertical direction so as to mechanically lift the aircraft.

8. The system of claim 6, wherein each cart of the plurality of carts further includes:
 a set of one or more wheels coupled to the platform; and
 a motor coupled to the power source and the set of one or more wheels, the motor being configured to cause the set of one or more wheels to rotate so that the platform moves.

9. The system of claim 3, wherein the plurality of chargers are disposed on the at least one pathway at fixed locations, wherein each cart of the plurality of carts is configured to temporarily stop when passing at least one of the plurality of chargers.

10. The system of claim 9, wherein the at least one pathway is a single pathway, and wherein the plurality of chargers are arranged in a row along the single pathway.

11. The system of claim 9, wherein the at least one pathway is a plurality of pathways, and wherein each of the plurality of pathways includes one of the plurality of chargers, such that each aircraft of the plurality of aircraft passes only one of the plurality of chargers when being moved from the landing zone to the takeoff zone.

12. The system of claim 1, wherein the transition zone is straight, and the transport equipment is configured to physically transport each of the plurality of aircraft while maintaining an orientation of each of the plurality of aircraft.

13. A system comprising:
 a landing zone located on a building rooftop and including a first runway configured to accommodate horizontal landing;
 a takeoff zone located on the building rooftop and including a second runway configured to accommodate horizontal takeoff;
 a transition zone located on the building rooftop and including at least one surface positioned between the landing zone and the takeoff zone, wherein an end of the first runway is positioned adjacent to a beginning of the transition zone, and an end of the transition zone is adjacent to a beginning of the second runway, the landing zone is oriented in a first direction, the takeoff zone is oriented in a second direction that is parallel to the first direction, the transition zone is oriented in a third direction that is at an angle to the first direction and the second direction; and
 a plurality of chargers, wherein each charger of the plurality of chargers is configured to electrically charge a battery of an aircraft located at the transition zone, and wherein each charger of the plurality of chargers includes:
 a power source; and
 an electrical coupler coupled to the power source, the electrical coupler configured to couple to and supply power to the battery of the aircraft.

14. The system of claim 13, wherein the takeoff zone has a length of 100 meters or less.

15. The system of claim 13, wherein the landing zone has a length of 100 meters or less.

16. The system of claim 13, wherein the transition zone has a length of 20 meters or less.

17. The system of claim 13, wherein the transition zone has a length of 60 meters.

18. The system of claim 13, wherein the transition zone is a straight elongated surface with no more than one single pathway configured for one-way traffic.

19. The system of claim 3, wherein the transition zone is a first transition zone, and further comprising:
 a return path for the plurality of carts between the landing zone and the takeoff zone, the return path being parallel and adjacent to the transition zone; and
 a second transition zone between the landing zone and the takeoff zone, the second transition zone being parallel to the first transition zone.

* * * * *